(12) United States Patent
Jayanti Venkata et al.

(10) Patent No.: US 10,129,109 B2
(45) Date of Patent: Nov. 13, 2018

(54) MANAGING CHANGE EVENTS FOR DEVICES IN AN ENTERPRISE SYSTEM

(71) Applicant: Oracle International Corporation, Redwood Shores, CA (US)

(72) Inventors: Bhagavati Kumar Jayanti Venkata, Bangalore (IN); Harsh Maheshwari, Indore (IN); Sidhartha Das, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/476,906

(22) Filed: Mar. 31, 2017

(65) Prior Publication Data
US 2017/0207985 A1    Jul. 20, 2017

Related U.S. Application Data

(62) Division of application No. 14/690,034, filed on Apr. 17, 2015, now Pat. No. 9,652,212.
(Continued)

(51) Int. Cl.
*G06F 15/16* (2006.01)
*H04L 12/24* (2006.01)
(Continued)

(52) U.S. Cl.
CPC ............ *H04L 41/5096* (2013.01); *G06F 8/65* (2013.01); *G06F 21/121* (2013.01);
(Continued)

(58) Field of Classification Search
CPC .......................... H04L 41/5096; H04L 67/36
(Continued)

(56) References Cited

U.S. PATENT DOCUMENTS 6,272,545 B1 * 8/2001 Flanagin .................. G06F 8/61
709/201
7,080,078 B1   7/2006 Slaughter et al.
(Continued)

FOREIGN PATENT DOCUMENTS

CN    101345757    1/2009
CN    102239482    11/2011
(Continued)

OTHER PUBLICATIONS

Can you pre-configure an app before deployment, Enterprise iOS Forums, Online retrieved from: http://www.enterpriseios.com/forum/topic/Can_you_pre_configure_an_app_before_deployment, Jan. 25, 2013, 2 pages.
(Continued)

*Primary Examiner* — Karen Tang
(74) *Attorney, Agent, or Firm* — Kilpatrick Townsend & Stockton LLP

(57) ABSTRACT

Techniques are disclosed for communicating to remote devices information about change events related to changes in access to an enterprise system. A device access management system may facilitate communication about a change event to the remote devices. Information about a change event may be stored in a change event object based on the type of change event (e.g., a policy change, an application change, and a settings change). A change event queue may persistently store information corresponding to change events. One or more computing nodes may be scheduled to execute an action process for each change event based on the type of the change event. A computing node may communicate information (e.g., an instruction to implement adjust access) about a change event to remote devices. A change event may persist on the queue until all remote devices are notified about the change event.

20 Claims, 12 Drawing Sheets

Related U.S. Application Data

(60) Provisional application No. 62/054,544, filed on Sep. 24, 2014.

(51) Int. Cl.
*H04L 29/08* (2006.01)
*G06F 21/12* (2013.01)
*G06F 8/65* (2018.01)
*H04L 29/06* (2006.01)
*H04W 4/08* (2009.01)

(52) U.S. Cl.
CPC ............ *H04L 63/101* (2013.01); *H04L 67/10* (2013.01); *H04L 67/12* (2013.01); *H04L 67/306* (2013.01); *H04L 67/36* (2013.01); *H04W 4/08* (2013.01)

(58) Field of Classification Search
USPC ........................................................ 709/217
See application file for complete search history.

(56) References Cited

U.S. PATENT DOCUMENTS

| | | | |
|---|---|---|---|
| 7,620,001 B2 | 11/2009 | Ganji | |
| 7,707,643 B2 | 4/2010 | DeMello et al. | |
| 7,711,796 B2 | 5/2010 | Gutt et al. | |
| 7,746,851 B2 | 6/2010 | Chandrasin et al. | |
| 7,886,033 B2 | 2/2011 | Hopmann et al. | |
| 7,894,458 B2 | 2/2011 | Jiang et al. | |
| 7,925,729 B2 | 4/2011 | Bush et al. | |
| 8,086,233 B2 | 12/2011 | Millet et al. | |
| 8,103,763 B2* | 1/2012 | Slepov | H04L 41/0253 709/220 |
| 8,281,010 B2 | 10/2012 | Ansari et al. | |
| 8,359,016 B2 | 1/2013 | Lindeman et al. | |
| 8,369,326 B2 | 2/2013 | Ansari et al. | |
| 8,548,452 B2 | 10/2013 | Coskun et al. | |
| 8,572,676 B2 | 10/2013 | Sapp et al. | |
| 8,583,683 B2 | 11/2013 | Rathod | |
| 8,595,186 B1 | 11/2013 | Mandyam et al. | |
| 8,615,581 B2 | 12/2013 | Dare et al. | |
| 8,650,290 B2 | 2/2014 | Dare et al. | |
| 8,688,147 B2 | 4/2014 | Nguyen et al. | |
| 8,769,270 B2 | 7/2014 | Orsini et al. | |
| 8,812,685 B2 | 8/2014 | Fuller | |
| 8,856,289 B2 | 10/2014 | Ansari et al. | |
| 8,935,275 B2 | 1/2015 | Rathod | |
| 9,077,733 B2* | 7/2015 | Kazan | G06F 9/4451 |
| 9,094,309 B2 | 7/2015 | Branch et al. | |
| 9,106,661 B1 | 8/2015 | Stamos | |
| 9,210,183 B2 | 12/2015 | Sadovsky et al. | |
| 9,270,492 B2 | 2/2016 | Ansari et al. | |
| 9,535,675 B2 | 1/2017 | Mohamad Abdul et al. | |
| 9,652,212 B2 | 5/2017 | Jayanti Venkata et al. | |
| 9,749,311 B2 | 8/2017 | Jayanti Venkata et al. | |
| 9,882,726 B2 | 1/2018 | Ma et al. | |
| 2004/0054676 A1 | 3/2004 | McNally et al. | |
| 2005/0021567 A1* | 1/2005 | Holenstein | G06F 11/2097 |
| 2005/0125509 A1 | 6/2005 | Ramachandran | |
| 2005/0203673 A1* | 9/2005 | El-Hajj | G06Q 10/08 701/1 |
| 2006/0048142 A1 | 3/2006 | Roese et al. | |
| 2007/0055752 A1 | 3/2007 | Wiegand et al. | |
| 2007/0093243 A1 | 4/2007 | Kapadekar et al. | |
| 2007/0243862 A1 | 10/2007 | Coskun et al. | |
| 2008/0059631 A1* | 3/2008 | Bergstrom | H04N 7/17318 709/224 |
| 2008/0065604 A1* | 3/2008 | Tiu | G06F 17/30569 |
| 2008/0168072 A1 | 7/2008 | Freedman | |
| 2009/0254392 A1 | 10/2009 | Zander | |
| 2009/0265701 A1 | 10/2009 | Naslavsky et al. | |
| 2009/0287818 A1* | 11/2009 | Tachibana | G06F 11/3006 709/224 |
| 2009/0300742 A1 | 12/2009 | Ahn | |
| 2010/0114618 A1 | 5/2010 | Wilcock et al. | |
| 2010/0174783 A1* | 7/2010 | Zarom | G06F 9/526 709/205 |
| 2010/0185263 A1 | 7/2010 | Stevenson et al. | |
| 2011/0010340 A1* | 1/2011 | Hung | H04L 12/1886 707/623 |
| 2011/0282836 A1* | 11/2011 | Erickson | G06F 17/30575 707/622 |
| 2012/0079026 A1* | 3/2012 | Tiu, Jr. | G06F 17/30569 709/204 |
| 2012/0084184 A1 | 4/2012 | Raleigh et al. | |
| 2012/0106399 A1 | 5/2012 | Abendroth et al. | |
| 2012/0131327 A1 | 5/2012 | Tomlinson | |
| 2012/0179802 A1 | 7/2012 | Narasimhan et al. | |
| 2012/0274864 A1* | 11/2012 | King | G08C 17/02 348/734 |
| 2012/0278454 A1 | 11/2012 | Stewart et al. | |
| 2012/0297444 A1 | 11/2012 | Kacherov et al. | |
| 2013/0013777 A1* | 1/2013 | Krywaniuk | H04L 41/00 709/225 |
| 2013/0204948 A1* | 8/2013 | Zeyliger | G06F 9/44505 709/206 |
| 2013/0219307 A1 | 8/2013 | Raber et al. | |
| 2013/0247028 A1 | 9/2013 | Brooks et al. | |
| 2013/0254834 A1 | 9/2013 | King | |
| 2013/0262626 A1 | 10/2013 | Bozek et al. | |
| 2014/0006347 A1 | 1/2014 | Qureshi et al. | |
| 2014/0007084 A1 | 1/2014 | Ding | |
| 2014/0007182 A1 | 1/2014 | Qureshi et al. | |
| 2014/0007183 A1 | 1/2014 | Qureshi et al. | |
| 2014/0007214 A1 | 1/2014 | Qureshi et al. | |
| 2014/0032759 A1 | 1/2014 | Barton et al. | |
| 2014/0040975 A1* | 2/2014 | Raleigh | H04W 12/12 726/1 |
| 2014/0068030 A1 | 3/2014 | Chambers et al. | |
| 2014/0082196 A1* | 3/2014 | Harrison | H04L 65/1069 709/225 |
| 2014/0100676 A1* | 4/2014 | Scott | G06F 3/0484 700/83 |
| 2014/0108801 A1 | 4/2014 | McBride et al. | |
| 2014/0113593 A1 | 4/2014 | Zhou et al. | |
| 2014/0162614 A1 | 6/2014 | Lindeman et al. | |
| 2014/0172799 A1 | 6/2014 | Dorman | |
| 2014/0199962 A1 | 7/2014 | Mohammed et al. | |
| 2014/0207220 A1 | 7/2014 | Boling et al. | |
| 2014/0229599 A1* | 8/2014 | Petrick | H04L 41/142 709/223 |
| 2014/0258970 A1* | 9/2014 | Brown | G06F 8/47 717/103 |
| 2014/0259178 A1 | 9/2014 | Karaa et al. | |
| 2014/0280815 A1 | 9/2014 | Candelaria et al. | |
| 2014/0337528 A1 | 11/2014 | Barton et al. | |
| 2014/0337862 A1* | 11/2014 | Valencia | G06F 8/71 719/313 |
| 2015/0009533 A1 | 1/2015 | Anno et al. | |
| 2015/0067135 A1* | 3/2015 | Wang | H04L 67/1002 709/223 |
| 2015/0070585 A1 | 3/2015 | Sharif-ahmadi et al. | |
| 2015/0135060 A1* | 5/2015 | Taylor | G06F 17/2247 715/234 |
| 2015/0156122 A1 | 6/2015 | Singh et al. | |
| 2015/0161386 A1* | 6/2015 | Gupta | G06F 11/3612 726/23 |
| 2015/0205669 A1* | 7/2015 | Sundaram | G06F 11/108 714/6.23 |
| 2015/0249684 A1 | 9/2015 | Zhang et al. | |
| 2015/0278245 A1 | 10/2015 | Sagar et al. | |
| 2015/0281087 A1 | 10/2015 | Jalan et al. | |
| 2015/0302338 A1 | 10/2015 | Zaveri | |
| 2015/0304891 A1 | 10/2015 | Dinan | |
| 2015/0356462 A1* | 12/2015 | Fawaz | G06N 99/005 706/12 |
| 2016/0085533 A1 | 3/2016 | Jayanti Venkata et al. | |
| 2016/0087854 A1 | 3/2016 | Jayanti Venkata et al. | |
| 2016/0087955 A1 | 3/2016 | Mohamad Abdul et al. | |
| 2016/0087956 A1 | 3/2016 | Maheshwari et al. | |
| 2016/0088021 A1 | 3/2016 | Jayanti Venkata et al. | |
| 2016/0088026 A1 | 3/2016 | Mohamad Abdul et al. | |

(56) References Cited

U.S. PATENT DOCUMENTS

| | | | |
|---|---|---|---|
| 2016/0199658 | A1 | 7/2016 | Nassif et al. |
| 2017/0063846 | A1 | 3/2017 | Mohamad Abdul et al. |
| 2017/0364225 | A1* | 12/2017 | Hammack .......... G05B 19/4188 |
| 2017/0374061 | A1 | 12/2017 | Jayanti Venkata et al. |
| 2018/0034808 | A1 | 2/2018 | Mohamad Abdul et al. |

FOREIGN PATENT DOCUMENTS

| | | |
|---|---|---|
| EP | 2282477 | 2/2011 |
| EP | 2676497 | 12/2013 |
| EP | 2716086 | 4/2014 |
| EP | 2757471 | 7/2014 |
| EP | 2759154 | 7/2014 |
| WO | 2008016580 | 2/2008 |
| WO | 2011123328 | 10/2011 |
| WO | 2012109751 | 8/2012 |
| WO | 2012164287 | 12/2012 |
| WO | 2013041849 | 3/2013 |
| WO | 2014036296 | 3/2014 |
| WO | 2014047168 | 3/2014 |
| WO | 2016048414 | 3/2016 |
| WO | 2016048415 | 3/2016 |
| WO | 2016048416 | 3/2016 |
| WO | 2016048417 | 3/2016 |

OTHER PUBLICATIONS

Complete Mobility Management Solutions for Samsung SAFE and KNOX Devices, Samsung for Enterprise (SAFE) Management, Online retrieved from: http://www.air-watch.com/solutions/android/samsung-for-enterprise/, Aug. 19, 2015, 3 pages.
Complete Mobility Management Solutions of Apple iOS, Apple iOS Device Management, Online retrieved from: http://www.air-watch.com/solutions/apple-ios/, Mar. 23, 2015, 4 pages.
Comprehensive App Security, Management and Deployments AirWatch Mobile Application Management Online retrieved from: http://www.air-watch.com/solutions/mobile-application-management/, Mar. 23, 2015, 4 pages.
Comprehensive Security, Management and User Enablement for Android, AirWatch for Android Devices, Online retrieved from: http://www.air-watch.com/solutions/android/, Mar. 23, 2015, 2 pages.
Configure and enforce policies across compatible IronKey secure USB mobile storage devices, Access Management Software, Online retrieved from: http://www.ironkey.com/en-US/access-enterprise/, Mar. 23, 2015, 3 pages.
Flexible Containerization for Your Mobile Deployment, AirWatch Workspace Management, online retrieved from: http://www.air-watch.com/solutions/container/, Mar. 24, 2015, 2 pages.
Manage Mobile Devices with Configuration Manager and Microsoft Intune, online retrieved from: http://technet.microsoft.com/en-us/library/jj884158.aspx, Aug. 19, 2015, 4 pages.
Mobile Device Management for iOS, Android & Windows Phone, online retrieved from: https://www.manageengine.com/products/desktop-central/mobile-device-management-mdm.html, Aug. 19, 2015, 4 pages.
StackOverflow-iphone plist, available online at http://stackoverflow.com/guestions/1756636/what-is-the-use-of-plist, 2009, 2 pages.
U.S. Appl. No. 14/689,722, Final Office Action dated Dec. 15, 2016, 25 pages.
U.S. Appl. No. 14/689,722, Non-Final Office Action dated Jun. 7, 2016, 20 pages.
U.S. Appl. No. 14/689,733, Non-Final Office Action dated Jun. 2, 2016, 6 pages.
U.S. Appl. No. 14/689,733, Notice of Allowance dated Aug. 29, 2016, 5 pages.
U.S. Appl. No. 14/689,733, Supplemental Notice of Allowance dated Dec. 1, 2016, 2 pages.
U.S. Appl. No. 14/689,983, Non-Final Office Action dated Dec. 9, 2016, 5 pages.
U.S. Appl. No. 14/690,034, Final Office Action dated Sep. 16, 2016, 12 pages.
U.S Appl. No. 14/690,034, Non-Final Office Action dated May 19, 2016, 15 pages.
U.S. Appl. No. 14/690,034, Notice of Allowance dated Jan. 5, 2017, 7 pages.
U.S. Appl. No. 14/690,045, Ex-Parte Quayle Action dated Feb. 24, 2017, 8 pages.
U.S. Appl. No. 14/690,062, Non-Final Office Action dated Nov. 10, 2016, 5 pages.
U.S. Appl. No. 14/690,062, Notice of Allowance dated Feb. 23, 2017, 8 pages.
U.S. Appl. No. 15/347,152, Non-Final Office Action dated Feb. 27, 2017, 7 pages.
Chanliau, Extending Enterprise Access and Governance with Oracle Mobile Security, Oracle Fusion Middleware, An Oracle White Paper, Mar. 2014, 29 pages.
Firtman, Programming the Mobile Web, Publisher: O'Reilly Media, Chapter 12, 2010, 4 pages.
International Application No. PCT/US2015/026594, International Preliminary Report on Patentability dated Apr. 6, 2017, 13 pages.
International Application No. PCT/US2015/026594, International Search Report and Written Opinion dated Aug. 10, 2015, 15 pages.
International Application No. PCT/US2015/026596, International Preliminary Report on Patentability dated Nov. 22, 2016, 11 pages.
International Application No. PCT/US2015/026596, International Search Report and Written Opinion dated Aug. 14, 2015, 12 pages.
International Application No. PCT/US2015/026596, Written Opinion dated Aug. 22, 2016, 7 pages.
International Application No. PCT/US2015/026697, International Preliminary Report on Patentability dated Sep. 2, 2016, 10 pages.
International Application No. PCT/US2015/026697, International Search Report and Written Opinion dated Jul. 24, 2015, 11 pages.
International Application No. PCT/US2015/026697, Written Opinion dated Apr. 4, 2016, 8 pages.
International Application No. PCT/US2015/026699, International Preliminary Report on Patentability dated Nov. 10, 2016, 9 pages.
International Application No. PCT/US2015/026699, International Search Report and Written Opinion dated Aug. 6, 2015, 11 pages.
U.S. Appl. No. 14/690,045, Notice of Allowance dated Apr. 26, 2017, 7 pages.
U.S. Appl. No. 14/689,722, "Notice of Allowance," dated May 5, 2017, 20 pages.
U.S. Appl. No. 15/684,142, filed Aug. 23, 2017.
EP Application No. 15721404.0, Notice of Allowance dated Sep. 9, 2017; 1-7 pages.
U.S. Appl. No. 15/684,142, "Non-Final Office Action", dated Dec. 28, 2017, 12 pages.
Application No. CN201580045976.3, "Office Action", dated Jan. 23, 2018, 10 pages (English translation).
U.S. Appl. No. 15/787,935, "Non-Final Office Action", dated Feb. 27, 2018, 9 pages.

\* cited by examiner

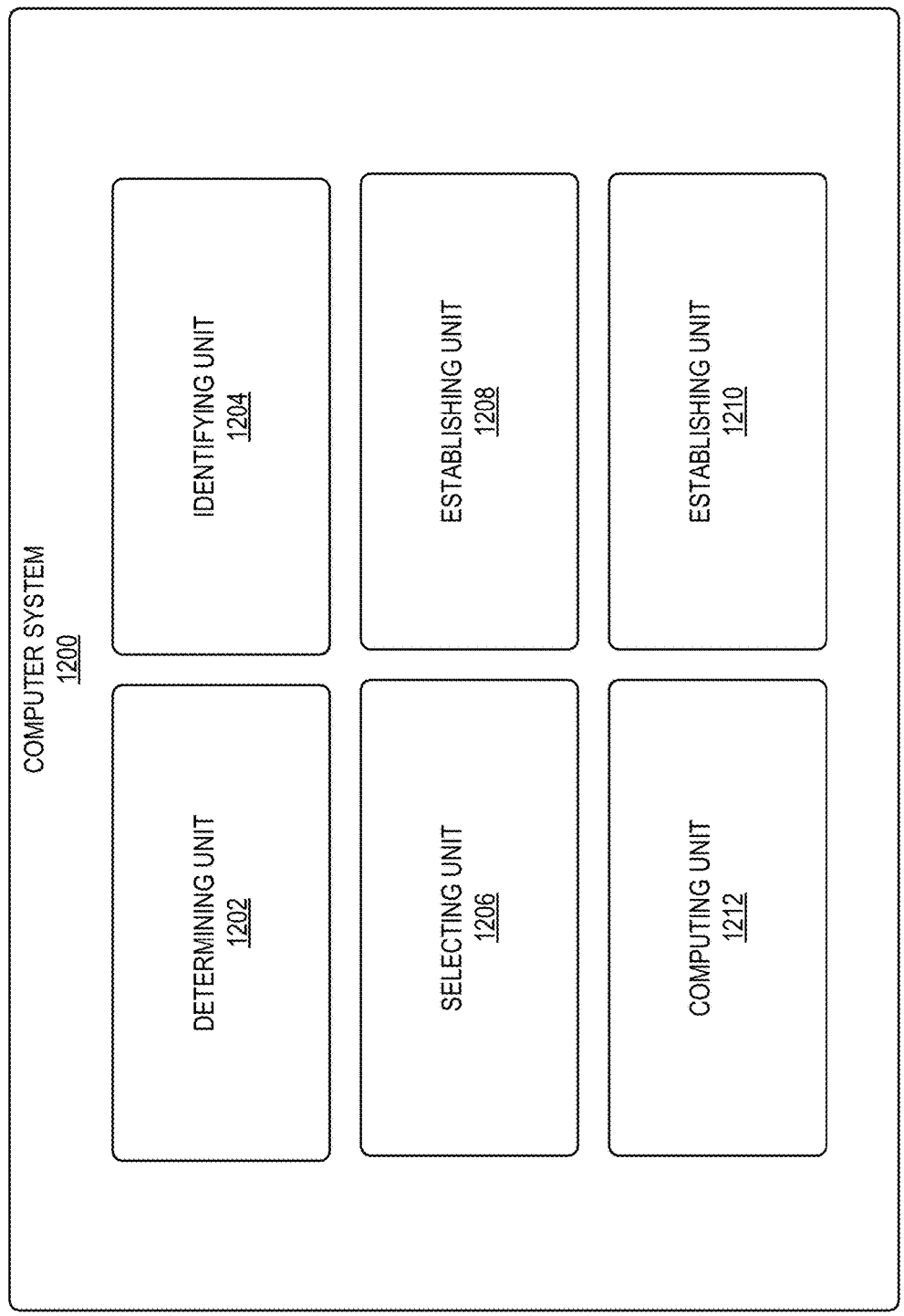

MANAGING CHANGE EVENTS FOR DEVICES IN AN ENTERPRISE SYSTEM

CROSS-REFERENCES TO RELATED APPLICATIONS

This application is a divisional of, and claims benefit and priority of U.S. Non-Provisional patent application Ser. No. 14/690,034, filed Apr. 17, 2015 and entitled "MANAGING CHANGE EVENTS FOR DEVICES IN AN ENTERPRISE SYSTEM", which claims benefit and priority of U.S. Provisional Patent Application No. 62/054,544, filed Sep. 24, 2014 and entitled "MOBILE SECURITY MANAGER (MSM)." The entire contents of each of the above-identified patent applications are incorporated by reference herein for all intent and purposes.

BACKGROUND

The present disclosure relates generally to managing events related to accessing an enterprise system using remote devices. More particularly, techniques are disclosed for communicating to remote devices information about events related to changes in access to the enterprise system.

With the proliferation of devices including mobile devices, many enterprises are adopting a "bring your own device" (BYOD) policy. BYOD enables users to bring their own devices to connect to an enterprise's system to access resources (e.g., applications or data) provided by the enterprise. A BYOD policy may permit users to continue use of their own devices for personal use. Managing different uses (e.g., personal use and corporate use) of user-owned devices in an enterprise system becomes a paramount concern for an enterprise. Permitting user-owned devices to access an enterprise system can present new security risks. Once access to an enterprise system is obtained by a user-owned device, the enterprise system may be exposed to security risks from non-compliant devices and non-compliant use of devices. Security becomes an even greater concern when user-owned devices are compromised (e.g., hacked, stolen, or lost).

To facilitate management of user-owned devices and corporate devices that access an enterprise system, some enterprises may implement a mobile device management (MDM) system and/or a mobile application management (MAM) system. Such systems may facilitate management and control of access to an enterprise system to ensure an enterprise system and its resources are secured. Management and control of access to an enterprise system may include communicating information about compliance and resources, and actions that must be taken for maintaining access to the enterprise system.

An enterprise that has thousands of users (e.g., employees, contractors, and customers), may be faced with the task of managing access for thousands of devices that access the enterprise. At any given time, an enterprise may have to communicate with many devices to inform those devices about the changes in access to an enterprise system. Due to the number of devices to which information needs to be communicated, a tremendous burden may be placed on the system(s) that manage communication of such information. The systems utilized to facilitate communication of information to devices may become overloaded, and sometimes unresponsive due to the number of devices that need to be notified. Many times, communication of information related to changes in access to an enterprise system may be delayed or not delivered. To complicate matters further, many devices may be affected by multiple changes related to accessing an enterprise system, such that information about multiple changes must be communicated to devices. On many occasions, information about changes in access may be forgotten or not processed by a device due to an error (e.g., device error or communication error) encountered by the device. Sometimes devices may encounter errors when information about the same change is communicated to those devices that previously encountered an error. As a result, some devices may not receive information about a change in access to an enterprise system. For example, if one access policy revokes access to a resource and another access policy provisions access to a resource that was revoked, then the order of the events based on the access policies determines the final access to that resource.

A messaging service, such as a Java® Messaging Service (JMS), may be implemented to support a publish-subscribe model. Such a model may allow changes to artifacts in an enterprise system to be notified by the enterprise system (acting as a publisher) to all interested subscribers of a topic of change. In the instance where there is one topic subscriber on each node in a server cluster, the messaging service may be unable to facilitate processing of a change among the subscribers, thereby leading to duplication of work or may result in an incorrect delivery order. A messaging service may be too heavyweight to enable management of new or different type of topics corresponding to a change in access to an enterprise system.

As a consequence of the many challenges described above for communicating, some devices may not receive information about changes in access to an enterprise system. Enterprises are searching for ways to improve communication of information for management of both user-owned and corporate devices, which access an enterprise system.

BRIEF SUMMARY

The present disclosure relates generally to managing events related to accessing an enterprise system using remote devices. More particularly, techniques are disclosed for communicating to remote devices information about events related to changes in access to the enterprise system. Access to an enterprise system may include access to resources and/or actions in a secure environment of a remote device that provides access to the enterprise system. A device access management system may be implemented to facilitate communication with remote devices that access an enterprise system.

The device access management system may manage information about a change event (e.g., a change in access to an enterprise system) based on a type of the change event. Examples of type of change event may include, without restriction, a policy change, an application change, and a settings change. Information about change events may be stored in a data structure implemented as an object ("change event object"), e.g., a plain old Java® object, based on the type of change event. A metadata class may be defined for each different type of change event. The metadata class may define one or more fields of information that can be stored in a change event object defined based on that metadata class. A new metadata class may be defined for as new or different types of change events are defined. Based on the type of change event, a change event object may be created to store information about that change event.

To ensure that information about a change event is persistent, such that communication of the information to remote devices affected by the change event is assured for those remote devices, the device access management system may implement a queue ("change event queue"). The change event queue may store information (e.g., a change event entry) corresponding to each change event object for a change event. The device access management system may communicate a change event to devices by transmitting information in a change event object to remote devices to inform them of the change event. In some embodiments, the device access management system may communicate a change event to remote devices using a notification service (e.g., a push notification service). The remote devices may communicate with a notification service to receive notification about change events. A change event entry may remain on the change event queue until all devices affected by the change event corresponding to the change event entry have been notified about the change event. In some embodiments, the change event may be retransmitted to remote devices to retry communication of the change event.

In some embodiments, an action process may be defined for each type of change events. The action process may be a routine defined by an action process class. The action process may be initiated for a type of change event corresponding to the action process class for that type of change event. The action process class may include communicating information about a change event (e.g., the change event object) to remote devices affected by a change corresponding to the change event. The information communicated to a remote device may include an instruction or a command that causes the remote device to adjust access based on the change event.

In some embodiments, the device access management system may utilize multiple computing nodes for execution of an access process corresponding to a change event. Multiple computing nodes may enable execution of the action process when the number of remote devices to be notified about the change event may be great. For example, upon determining that thousands of remote devices are affected by a change event, multiple computing nodes may be enlisted to perform the action process to notify different remote devices about the change event. Each computing node would implement a different instance of an action process to handle communicating the change event to a different set of remote devices. Use of multiple computing nodes may balance the load for execution of the action process for different remote devices affected by the change event, rather than executing the action process on a single computing node for all the remote devices. A computing node designated to execute the action process for remote devices may handle management of the change event until each of those remote device receives a notification about the change event. In some embodiments, a remote device may send a communication to the computing node indicating that the change event has been acknowledged. By distributing the action process between multiple computing nodes, performance efficiency for communicating the change event to remote devices may be improved. A processing load for an action process may be balanced between multiple computing nodes such that one computing node is not overwhelmed to execute an action process for all remote devices affected by the change event.

Some embodiments of the present invention may be implemented by a computing system. The computing system may be implemented as part of a device access management system. The computing system may implement methods and operations. In at least one embodiment, the computing system may include one or more processors and a memory storing instructions that, when executed by the one or more processors, cause the one or more processors to implement operations. The operations may be implemented to perform a method. In some embodiments, a non-transitory computer-readable medium may comprise instructions, that when executed by one or more processors, causes operations to be performed. In some embodiments, a non-transitory computer-readable medium may protect a computer from an electronic communication containing malicious code. In one example, instructions stored on a computer-readable medium, when executed by one or more processors, may cause the methods and operations described below to be implemented. Yet other embodiments relate to systems and machine-readable tangible storage media which employ or store instructions for the methods and the operations described below.

In at least one embodiment, a method may be implemented by the computer system. The method may include determining a type of change event corresponding to a change in access to an enterprise system for a plurality of remote devices. The method may include identifying an action process class associated with the type of change event. The action process class may define an action process to perform for the type of change event. The method may include selecting, based on a processing load of each of a plurality of computing nodes, a set of computing nodes of the plurality of computing nodes to perform the action process for the change in access. The method includes establishing, based on the type of change event, a first change event object for a first set of remote devices in the plurality of remote devices. A change event object may indicate information about the change in access. Establishing the first change event object may include instantiating the first change event object based on a change event entry for the first set of remote devices. The change event entry for the first set of remote devices may include information identifying each of the first set of remote devices. The first change event object may include information identifying each of the first set of remote devices. The method includes establishing, based on the type of change event, a second change event object for a second set of remote devices in the plurality of remote devices. Change event objects and action objects may be plain old Java® objects. Each of the first set of remote devices may be different from each of the second set of remote devices.

The method includes initiating, by a first computing node of the set of computing nodes, using the first change event object, the action process for a first action process object. The first action process object may be established based on the action process class. The method includes initiating, by a second computing node of the set of computing nodes, using the second change event object, the action process for a second action process object. The second action process object may be established based on the action process class. The action process initiated for the first action process object may be initiated concurrently with the action process initiated for the second action process object.

In some embodiments, the method may include adding, to a change event queue, a change event entry for each of the first set of remote devices and the second set of remote devices. The change event entry may indicate the change in access and the type of change event. The method may include removing, from the change event queue, the change event entry for the first set of remote devices upon receiving a response from each of the first set of remote devices. The response may indicate that each of the first set of remote devices has applied the change in access corresponding to the type of change event.

In some embodiments, initiating, using the first change event object, the action process for a first action process object may include: establishing the first action process object by instantiating the action process class using the first change event object; and invoking the action process using the first action process object.

In some embodiments, an action process invoked for the first action process object includes transmitting, to each of the first set of remote devices, an instruction indicating the change in access. The instruction may cause at least one remote device in the first set of remote devices to apply the change in access.

In some embodiments, the method may include computing the processing load for each of the plurality of computing nodes. A processing load of a computing node may be computed based on a number of action processes the computing node has initiated. The first computing node is selected for the set of computing nodes based on an action process threshold. In some embodiments, each of the set of computing nodes is selected based on the processing load for each of the set of computing nodes satisfying the action process threshold.

In some embodiments, the method may include identifying the type of change event. The type of change event may include a policy change, the policy change including a change in a compliance policy, a change in an enrollment policy, a change in a workspace policy, a change in a device policy, or a combination thereof. The action process to perform for a set of remote devices may include instructing each of the set of remote devices to apply the policy change.

In some embodiments, the method may include identifying a type of change event. The type of change event may include an application change, the application change including adding an application to a catalog of applications accessible to the plurality of remote devices, removing an application from the catalog, modifying a version of an application in the catalog, or a combination thereof. The action process to perform for a set of remote devices may include instructing each of the set of remote devices to apply the application change.

In some embodiments, the method may include identifying a type of change event. The type of change event may include a change in a synchronization setting related to accessing the enterprise system. The action process to perform for a set of remote devices may include instructing each of the set of remote devices to apply the change in the synchronization setting.

In at least one embodiment, another method may be implemented by the computer system. The method may include determining an action to be performed on a plurality of remote devices. The method may include adding, on a queue, a change event entry for each of a first set of remote devices and a second set of remote devices of the plurality of remote devices, thereby adding multiple change event entries to the queue. Each of the first set of remote devices may be different from each of the second set of remote devices. The method may include assigning, from the queue to a first computing node, a first change event entry corresponding to the first set of remote devices. The method may include instantiating a first metadata object for the first change event entry and storing metadata identifying each of the first set of remote devices in the first metadata object. Instantiating of the first metadata object may be performed on the first computing node. The method may include instructing, from the first computing node, the action to be taken on each of the first set of remote devices based on the first metadata object. The method may include assigning, from the queue to a second computing node, a second change event entry corresponding to the second set of remote devices. The method may include instantiating a second metadata object for the second change event entry and storing metadata identifying each of the second set of remote devices in the second metadata object. The method may include instructing, from the second computing node, the action to be taken on each of the second set of remote devices based on the second metadata object.

The foregoing, together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 12 illustrates an exemplary computer system that may be used to implement an embodiment of the present invention.

DETAILED DESCRIPTION

Figure 1:
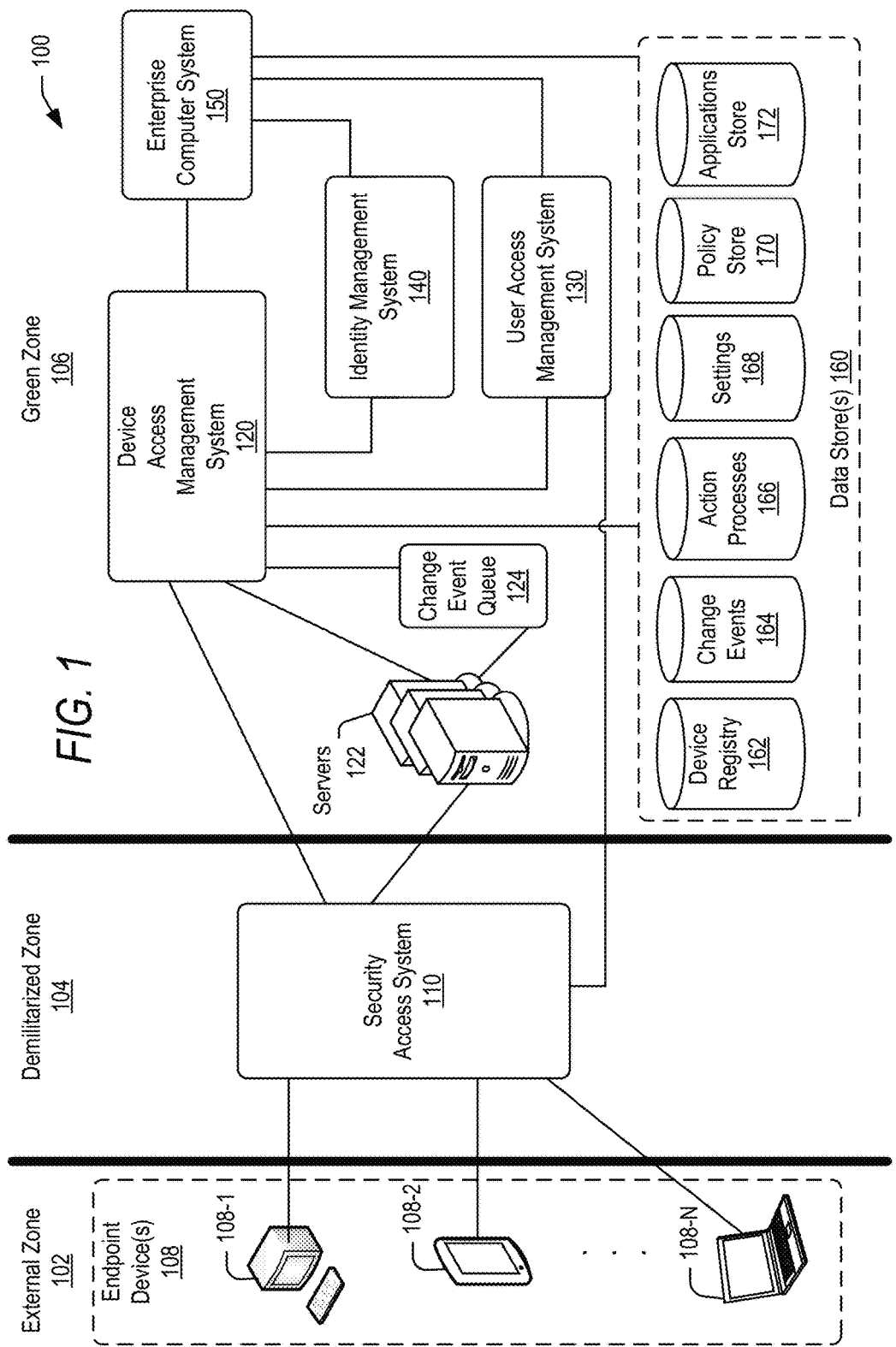
FIG. 1 depicts a simplified high level diagram of a computing system including a device access management system for managing change events for changes in access to an enterprise system according to some embodiments of the present invention.

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present disclosure relates generally to managing events related to accessing an enterprise system using remote devices. More particularly, techniques are disclosed for communicating to remote devices information about events related to changes in access to the enterprise system. Access to an enterprise system may include access to resources and/or actions in a secure environment of a remote device that provides access to the enterprise system. A device access management system may be implemented to facilitate communication with remote devices that access an enterprise system.

The device access management system may utilize multiple computing systems to communicate information about a change event to several remote devices. Technical advantages of some embodiments of the invention include a system that enables different change events to be defined to enable change events to be communicated to a large number of remote devices at any given time. By defining different change events using a metadata class, computing systems can be added or removed for facilitating communication of change events. With little or no configuration, computing systems can be added to communicate information about change events based on the type of change event defined for a metadata class corresponding to the type of change event. The device access management system may manage information about a change event (e.g., a change in access to an enterprise system) based on a type of the change event. Examples of type of change event may include, without restriction, a policy change, an application change, and a settings change. Information about change events may be stored in a data structure implemented as an object ("change event object"), e.g., a plain old Java® object, based on the type of change event. A metadata class may be defined for each different type of change event. The metadata class may define one or more fields of information that can be stored in a change event object defined based on that metadata class. A new metadata class may be defined for as new or different types of change events are defined. Based on the type of change event, a change event object may be created to store information about that change event.

To ensure that information about a change event is persistent, such that communication of the information to remote devices affected by the change event is assured for those remote devices, the device access management system may implement a queue ("change event queue"). The change event queue may store information (e.g., a change event entry) corresponding to each change event object for a change event. The device access management system may communicate a change event to devices by transmitting information in a change event object to remote devices to inform them of the change event. In some embodiments, the device access management system may communicate a change event to remote devices using a notification service (e.g., a push notification service). The remote devices may communicate with a notification service to receive notification about change events. A change event entry may remain on the change event queue until all devices affected by the change event corresponding to the change event entry have been notified about the change event. In some embodiments, the change event may be retransmitted to remote devices to retry communication of the change event.

Technical advantages of some embodiments of the invention include ensuring that information about change events are delivered to remote devices affected by those change events. The change event queue may enable the device access management system to manage information about change events and an order of those change events. Some remote devices may lose connectivity to an enterprise system for various reasons. A remote device can obtain information about a change event long after an occurrence of the change event because the change event may remain on the change event queue until all remote devices affected by the change event are notified. The remote device may be notified periodically about the change event without causing a delay in the communication of other change events.

Technical advantages of some embodiments of the invention include a system that enables different action processes to be defined based on a type of change event. In some embodiments, an action process may be defined for each type of change events. The action process may be a routine defined by an action process class. By defining an action process class for an action process, computing systems added to expand computing resources for managing change events can easily determine an action process without additional manual configuration. In a system that is grows in the number of devices to be notified, the system can be easily expanded with little manual configuration to enable the system to handle processing and communication of change events to remote devices. The action process may be initiated for a type of change event corresponding to the action process class for that type of change event. The action process class may include communicating information about a change event (e.g., the change event object) to remote devices affected by a change corresponding to the change event. The information communicated to a remote device may include an instruction or a command that causes the remote device to adjust access based on the change event.

In some embodiments, the device access management system may utilize multiple computing nodes for execution of an access process corresponding to a change event. Multiple computing nodes may enable execution of the action process when the number of remote devices to be notified about the change event may be great. For example, upon determining that thousands of remote devices are affected by a change event, multiple computing nodes may be enlisted to perform the action process to notify different remote devices about the change event. Each computing node would implement a different instance of an action process to handle communicating the change event to a different set of remote devices. Use of multiple computing nodes may provide many technical advantages. The computing nodes can balance the load for execution of the action process for different remote devices affected by the change event, rather than executing the action process on a single computing node for all the remote devices. A computing node designated to execute the action process for remote devices may handle management of the change event until each of those remote device receives a notification about the change event. In some embodiments, a remote device may send a communication to the computing node indicating that the change event has been acknowledged. By distributing the action process between multiple computing nodes, performance efficiency for communicating the change event to remote devices may be improved. A processing load for an action process may be balanced between multiple computing nodes such that one computing node is not overwhelmed to execute an action process for all remote devices affected by the change event. In the instance when a computing node is unable to notify a remote device about a change event, a different computing node may be utilized to continue to notify the remote device without affecting processing of other computing nodes. Therefore, by defining change events and action processes using classes, computing nodes with available processing resources can handle communication of information about a change event.

FIG. 1 depicts a simplified high level diagram of a computing system 100 for managing change events for changes in access to an enterprise system according to some embodiments of the present invention. In particular, computing system 100 may be implemented to manage communication with devices (e.g., remote devices) that remotely access an enterprise system to inform those devices about information (e.g., change events) related to accessing the enterprise system. Embodiments depicted in FIG. 1 are merely examples and is not intended to unduly limit the claimed embodiments of the present invention. One of ordinary skill in the art would recognize many variations, alternatives, and modifications.

Computing system 100 may be part of an enterprise system implemented for an enterprise. Computing system 100 may include enterprise computer system 150, which provides access to one or more resources provided by enterprise computer system 150. Examples of resources may include an application, a service, data, or a combination thereof, any of which may be hosted by a third party provider and provided to remote devices by enterprise computer system 150.

Users may access enterprise computing system 150 using one or more remote devices, such as remote devices 108-1, 108-2, . . . 108-N (collectively remote devices 108). Access to enterprise computer system 150 using remote devices 108 may be controlled and managed by device access management system 120. Each of remote devices 108 may include a secure container application. The secure container application may provide a secure execution environment for communicating with device access management system 120 to access enterprise computer system 150. Remote devices 108 may communicate with device access management system 120 to obtain access to resources (e.g., an application) provided by enterprise computer system 150. Access to enterprise computer system 150 controlled by device access management system 120 may include access to resources on a remote device and/or access to perform actions in the secure container application.

Device access management system 120 may manage authentication and enrollment of remote devices 108 for accessing enterprise computer system 150. In some embodiments, device access management system 120 can manage change events related to accessing enterprise computer system 150 using remote devices 108. Specifically, device access management system 120 can communicate to remote devices 108 information about events related to changes in access to enterprise computer system 150 by those remote devices 108.

Computing system 100 may be defined by multiple zones, each corresponding to a different communication zone. In some embodiments, remote devices 108 may be located in an external communication zone ("external zone") 102. Device access management system 120 and enterprise computer system 150 may be located in a green communication zone ("green zone") 106. Green zone 106 may include one or more secure networks (e.g., a corporate network). Green zone 106 may be located inside the firewalls of an enterprise computing environment. External zone 102 may be part of an external network (e.g., the Internet), which can be unsecure. For example, external zone 102 may be located outside the firewalls of green zone 106.

In some embodiments, remote devices 108 may communicate with computer systems in green zone 106 through a security access system 110 located in a demilitarized zone (DMZ) 104. An example of DMZ 104 may be a corporate DMZ. Security access system 110 may facilitate secure communication between remote devices 108 and device access management system 120. For example, security access system 110 may provide a secure communication connection (e.g., tunnel) between a secure container application on any of remote devices 108 and device access management system 120.

Security access system 110 may provide services to authenticate a user of a remote device. Security access system 110 may communicate with a user access management system 130 to obtain authorization for a user of a remote device. For example, security access system 110 may obtain authorization tokens from user access management system 130 to facilitate single sign-on (SSO) authentication to resources provided by enterprise computer system 150. In one example, security access system 110 may be included in Oracle Mobile Security Access Server, which is part of Oracle Mobile Security Suite provided by the Oracle® Corporation.

Remote device 108 may be of various different types, including, but not limited to, endpoint devices, a wearable device (e.g., a smart watch), a consumer device (e.g., an appliance), personal computers, desktops, Internet of Things (IOT) devices, mobile or handheld devices such as a laptop, a mobile phone, a tablet, computer terminals, etc., and other types of devices. In some embodiments, a remote device may be an application hosted on a computing device (e.g., a mobile device, an IOT Gateway, or an IOT Edge device). In some embodiments, a remote device may be endpoint, such as a workspace, that is running on another device. A workspace may be a controlled environment to provide access to enterprise data and applications on a device running the workspace. For example, a secure container application may run on one or more of remote devices 108. Examples of remote devices may include, without limitation, devices (e.g., a corporate device) issued by an enterprise associated with enterprise computer system 150 or a user's personal device ("BYOD device") that is used to access enterprise computer system 150.

A remote device may store information about its identity, for example, a MAC (media access control) address, a unique device identifier (UDID), or other device identifiers. A remote device may store metadata attributes about the remote device, including, a type of operating system on the remote device, a version of the operating system, a host identifier if the remote device is hosted on another device, a device type, an IMEI (International Mobile Equipment Identity) number, a model of the remote device, a service provider (e.g., a carrier) of the remote device, a device name, a device state, or other information about the remote device.

In certain embodiments, a remote device may be configured to implement (e.g., execute and operate) one or more applications. For example, one or more of remote devices 108 may execute a secure container application that is designed to hold "containerized" applications, i.e., applications that have been securely linked to their specific container. Examples of applications may include, without limitation, a computer application, a client application, a proprietary client application, a workspace, a container, and the like. In some embodiments, an application implemented by a remote device may be accessible or operated via one or more network(s).

A remote device may include a computing device that can be implemented using hardware, firmware, software, or combinations thereof. A remote device may include memory and one or more processors. A memory may be coupled to the processor(s) and may include instructions stored thereon which, when executed by the processor(s), cause the processor(s) to implement one or more operations, methods, or processes disclosed herein. A memory may be implemented using any type of persistent storage device, such as computer-readable storage media.

In some embodiments, remote devices 108 may be communicatively coupled to device access management system 120 and enterprise computer system 150 via one or more communication networks of various types. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Device access management system 120 may be implemented in a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. For example, device access management system 120 may include servers 122. All or some of servers 122 may be located in the same geographical location or different geographical locations. The computing devices that make up device access management system 120 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Device access management system 120 may be implemented using hardware, firmware, software, or combinations thereof. In one example, device access management system 120 may be included in Oracle Mobile Security Manager, which is part of Oracle Mobile Security Suite provided by the Oracle® Corporation.

Device access management system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in device access management system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.).

The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Device access management system 120 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, device access management system 120 may be coupled to or may include one or more data stores, e.g., data stores 160. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

In some embodiments, device access management system 120 can manage enrollment and authentication of remote devices 108 to access enterprise computer system 150. Remote devices 108 may be enrolled for user identities registered to access enterprise system 120. Just as a user identity is used to authenticate a user, a remote device may be registered with an identity that is used to authenticate the remote device. An identity may be provisioned to a remote device and may be used to authenticate all further communications from that remote device.

Device access management system 120 may store information about remote devices 108 in device registry 162 of data stores 160. The information may indicate a relationship between an identity of a user and an identity of each of one or more remote devices registered to access enterprise computer system 150 for that identity. Device access management system 120 may issue a certificate to a remote device for enrollment of that remote device with a user identity for accessing enterprise computer system 150. Device access management system 120 may allow a remote device to access enterprise computer system 150 if a request is from a user identity associated with an identity of the remote device.

Device access management system 120 may be communicatively coupled to an identity management system 140. Identity management system 140 may manage the lifecycle of users of enterprise computer system 150 and their associated accounts provisioned for resources accessed from enterprise computer system 150. Identity management system 140 may manage roles (e.g., user groups) defined for accessing enterprise computer system 150. In some embodiments, identity management system 140 may implement manage policies for roles defined for accessing enterprise computer system 150. Examples of identity management system 140 may include Oracle Identity Manager provided by the Oracle® Corporation.

User access management system 130 may be communicatively coupled to device access management system 120. User access management system 130 may handle scope management, issuance of authorization tokens, issuance of refresh tokens, and issuance of access tokens. For example, user access management system 130 may process requests from security access system 110 for access by remote devices 108. In some embodiments, user access management system 130 may manage access policies for access to resources provided by enterprise computer system 150. Examples of user access management system 130 may include Oracle Access Manager provided by the Oracle® Corporation.

In some embodiments, device access management system 120 may manage settings of remote devices 108 that are enrolled to access enterprise computer system 150. Examples of settings may include, without limitation, device settings, installation settings, synchronization settings, communication settings, application settings, or other settings related to accessing an enterprise system. Information about settings may be stored in settings data store 168 of data stores 160. Some settings may correspond to information received from remote devices 108. Settings (e.g., device settings and installation settings) for some remote devices 108 may be verified for enrollment and checked for compliance by enrolled remote devices 108. In some embodiments, settings (e.g., synchronization settings) may be communicated to some remote devices 108 to enable the secure container application on remote devices 108 to configure synchronization of communication with device access management system 120 and enterprise computer system 150.

Access to enterprise computer system 150 using remote devices 108 can be managed using one or more policies. Policies may be stored in and accessed from policy store 170 in data stores 160. Examples of policies may include, without limitation, enrollment policies, compliance policies, workspace policies, and device policies. Policies may be defined by an administrator of enterprise system. Device access management system 120 may determine whether remote devices 108 are compliant with policies, which defines their access to enterprise computer system 150. In some embodiments, device access management system 120 can perform remedial actions to adjust access for a remote device based on a policy. Device access management system 120 may communicate instructions to a remote device to instruct the remote device to take remedial action in response to compliance according to a policy. Notifications can be sent to remote devices 108 to inform them of compliance and/or non-compliance with a policy and a time period for compliance.

As explained above, device access management system 120 may manage communication of information about change events (e.g., event related to change in access) to remote devices 108 enrolled to access enterprise computer system 150. Information about change events may be stored and accessed from change events data store 164 in data store 160. In some embodiments, information about change events may be received from enterprise computer system 150, identity management system 140, and/or user access management system 130. Information about change events may be received from a computing system operated by an administrator.

Upon identifying a change event, device access management system 120 can identify a type of change event. The type of change event can be determined based on information about a change event accessed from change events data store 164 device access management system 120. Examples of types of change events may include, without limitation, a policy change, an application change, and a settings change. Other examples of types of change events may include, without limitation, a change in access to resources on a remote device in the secure container application executing on the remote device and a change in actions that can be performed in the secure container application. For example, an action may include performing a copy-paste operation from an application in the secure container application to a an application outside the secure container application container. In some embodiments, a change event may correspond to a change in access that can be enforced on a remote device (e.g., the secure container application executing on the remote device). Where a change in access can be enforced by device access management system 120 without a change at a remote device, the change in access may not be communicated to the remote device. As such, change events may correspond to change that is enforceable at a remote device. Types of change events are further described below with reference to FIGS. 5 and 7. Device access management system 120 may determine a type of change event for a change based on a change event class that matches the change.

Device access management system 120 may implement a persistent change event queue 124 to manage change events corresponding to changes in access to an enterprise system. Information about a change event may be placed in a change event entry on change event queue 124 for processing by one or more of servers 122. Servers 122 may be utilized to execute an action process for managing access to enterprise computer system 150 in response to a change event. A change event entry may remain on change event queue 124 in a persistent fashion such that they are not removed until each remote device affected by the change event has been notified about the change event. In some embodiments, a remote device may communicate with one of servers 122 to send a message indicating acknowledgement for receiving notification about a change event. The server with which a remote device communicates is one which communicated a notification. The acknowledgement may indicate that the notification about the change event has been received. Change event queue 124 may enable device access management system 120 to manage change events to ensure that remote devices affected by each of those change events are notified about those change events. In some cases, a remote device may communicate an acknowledge indicating receipt of a change event when the remote device has adjusted access to enterprise computer system 150 based on the change event.

In some embodiments, a change event object (e.g., a plain old Java® object) may be instantiated for a change event. A change event object may be instantiated based on a change event class, which is identified for a type of change event. A change event object may store information about a change event. A change event class may define the type of information to store in a change event object for a type of change event. Remote devices 108 may be configured with information identifying change event classes. By defining a change event class, remote devices and servers 122 can identify a type of change event and the information corresponding to the change event based on the information defined by a change event class.

Device access management system 120 may schedule one or more servers 122 to execute an action process for each change event identified on change event queue 124. An action process may include communicating information about a change event to remote devices affected by the change event. The information about the change event may be communicated asynchronously to the remote devices. In some instances, multiple change events may occur that affect the same remote device. In these instances, each of the change events may be communicated to the same remote device in an asynchronous manner. However, when the change events are dependent on the order of occurrence of those change events, each of the change events may be communicated in the order of occurrence.

With thousands of users accessing enterprise computer system 150, a single server may be overloaded to communicate information about a change event to all or many of remote devices 108 affected by a change event. Device access management system 120 may determine a processing load for servers 122 to determine a set of servers 122 that can be utilized to communicate information about a change event. By scheduling some of servers 122 to execute an action process, a processing load may be reduced on some servers 122 that are overloaded with processing other action processes.

Figure 2:
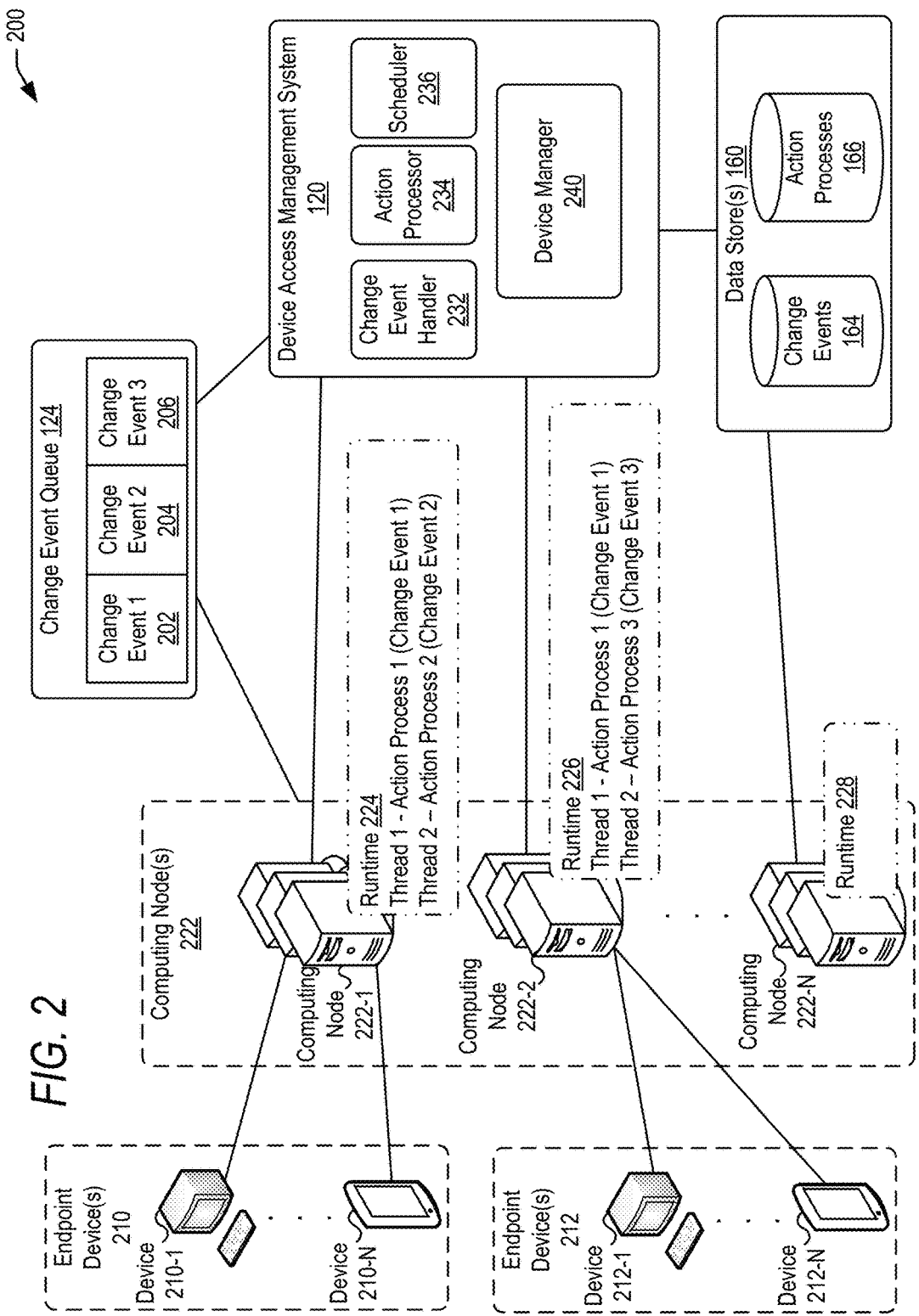
FIG. 2 shows a more detailed high level diagram of a device access management system according to some embodiments of the present invention.
Figure 3:
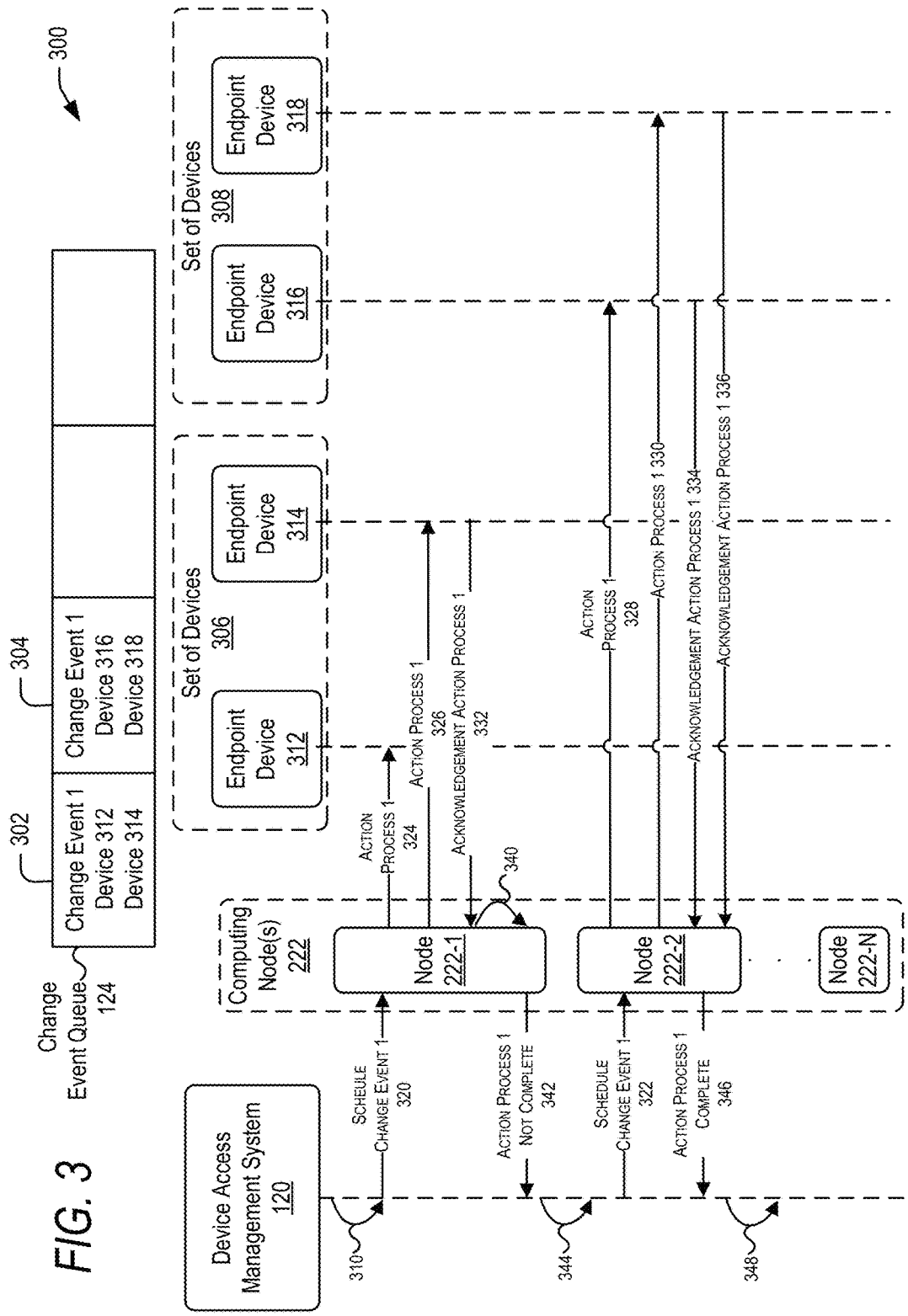
FIG. 3 illustrates a sequence of operations for initiating an action process for a change event according to some embodiments of the present invention.
Figure 4:
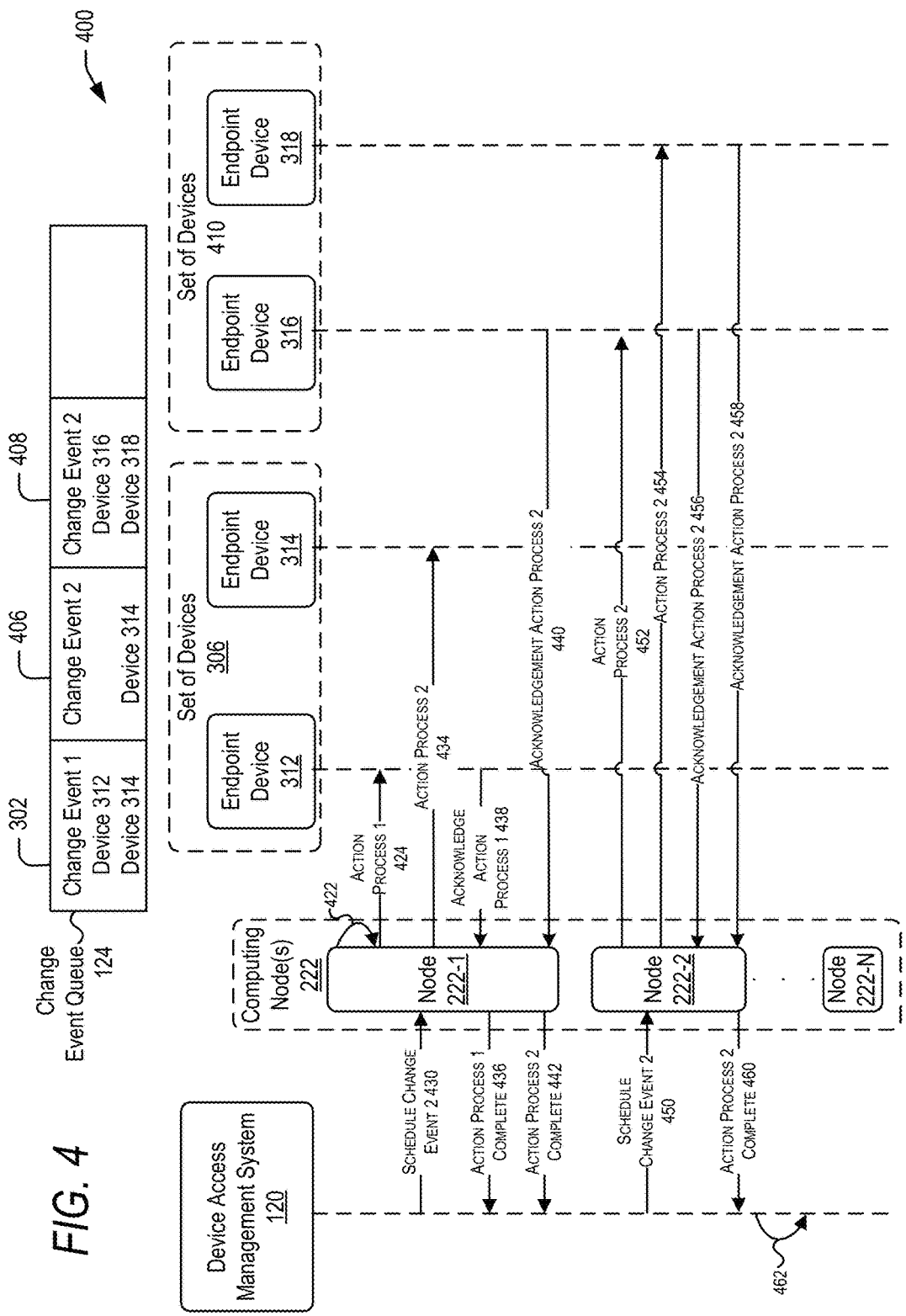
FIG. 4 illustrates a sequence of operations for initiating an action process for a change event according to some embodiments of the present invention.

To further improve processing efficiency for communication of a change event, device access management system 120 may request multiple servers in servers 122 to execute an action process for different sets of remote devices affected by a change event. Scheduling processing on servers 122 is further described with reference to FIGS. 2-4. A plurality of computing nodes may be operated based on servers 122. FIGS. 2-4 depict device access management system 120 and a plurality of computing nodes that may be used to implement actions on remote devices for changes in access to an enterprise system. Embodiments described with reference to FIGS. 2-4 illustrate techniques that device access management system 120 may implement to improve efficiency for communicating changes in access to an enterprise system and performing actions on remote devices in response to those changes. FIGS. 2-4 further illustrate techniques for implementing use of multiple computing nodes to reduce time for communicating changes to remote devices.

For each of the change event entries on change event queue 124, one or more of servers 122 may be requested by device access management system 120 to initiate an action process. An action process may be identified based on a type of a change event indicated by a change event entry. An action process may be a routine defined by an action process class. An action process may be initiated for a type of change event corresponding to the action process class for that type of change event. The action process class may include communicating information about a change event (e.g., the change event object) to remote devices affected by a change corresponding to the change event. The information communicated to a remote device may include an instruction or a command that causes the remote device to adjust access to enterprise computer system 150 based on the change event. Examples of action processes are described with reference to FIG. 6.

Now turning to FIG. 2, a more detailed high level diagram of device access management system 120 is shown according to some embodiments of the present invention. As shown in FIG. 2, device access management system 120 may include several subsystems and/or modules including change event handler 232, action processor 234, scheduler 236, and device manager 240. These subsystems and modules may be implemented in software (e.g., program code, instructions executable by a processor), in hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

With the adoption of BYOD for enabling access to an enterprise system (e.g., enterprise computer system 150), many users may access the enterprise system using their remote devices. For example, a first user may use a set of endpoint devices 210-1, . . . 210-N (collectively, endpoint devices 210) to access an enterprise system. A second user may use a set of endpoint devices 212-1, . . . 212-N (collectively, endpoint devices 212) to also access an enterprise system. Although FIG. 2 depicts some remote devices that are used to access an enterprise system, the enterprise system may be accessed by thousands of users with thousands of device. Access to the enterprise system may be controlled through a computing system (e.g., computing system 100) including device access management system 120. With thousands of remote devices accessing an enterprise system, managing changes in the access to the enterprise system may be difficult. Each change that occurs may need to be communicated to several devices to ensure their compliance with the changes.

To overcome the obstacles for communicating changes in access to many remote devices, device access management system 120 may employ the use of computing node 222-1, computing node 222-2, . . . computing node 222-N (collectively, computing nodes 222). Computing nodes 222 may be implemented for servers 122 of FIG. 1. Computing nodes 222 may be operated using servers 122 of FIG. 1. Each of computing nodes 222 may be included in or communicatively coupled to device access management system 120. As explained below, multiple computing nodes may be utilized to execute one or more action processes for different remote devices.

Device manager 240 may manage enrollment and compliance for remote devices accessing an enterprise system. Device manager 240 may monitor and determine remote devices affected by a change event by checking information about remote devices in device registry 162. In some embodiments, device manager 240 may determine whether a remote device is affected by a change event based on enrollment of the remote device to access an enterprise system.

Change event handler 232 may determine a change event corresponding to a change in access to an enterprise system for remote devices, e.g., endpoint devices 210 and endpoint devices 212. Information about change events may be accessed from change events data store 164. Change event handler 232 may identify a type of change event based on a change event class for a change.

Change event handler 232 may create a data structure (e.g., a change event entry) to store information about the change event. For example, change event entry 202 may be created for change event 1, change event entry 204 may be created for change event 2, and change event entry 206 may be created for change event 3. Each of change events 1-3 may occur at the same time or at different times. A change event entry may be added to change event queue 124, where it can be accessed later by one or more of computing nodes 222 for executing an action process corresponding to the change event. As explained above, change event queue 124 may be implemented to manage change events in a persistent manner to ensure that remote devices affected by a change are notified about a change in access to an enterprise system.

Change event queue 124 may be implemented as one or a combination of different types of queues including, without restriction, a linked list queue, a first-in-first-out (FIFO) queue, or other types of data structures implemented as a queue. In some embodiments, change event queue 124 may be implemented as a database that stores change event entries in a relational manner. In some embodiments, change event entries are added and removed from change event queue 124 using serialization. Examples of serialization may include, without limitation, extended markup language (XML) serialization, or other types of serialization techniques.

A change event entry may be processed by scheduling one or more of computing nodes 222 to execute an action process for a change event identified by the change event entry. In some embodiments, change event queue 124 may be processed in a FIFO order based on an order in which change event entries are added to change event queue 124. In some embodiments, multiple change event entries may be processed concurrently by one or more of computing nodes 222. For example, change event entry 204 may be processed before change event entry 202 is processed. Change event entry 204 may be processed before change event entry 202 because each remote device identified in change event entry 202 may not been notified about the change event corresponding to change event entry 202. A change event entry may remain on change event queue 124 until each remote device identified in the change event entry is notified about the change.

The information in the change event entry may include the type of change event, the change in access to the enterprise system, and device identifiers of the remote devices affected by the change. A change event entry may indicate a set of remote devices to be informed about the change event. An example of a change event entry is described below with reference to FIG. 5. As will be explained further below, a computing node may be requested to perform an action process for a change event, and in doing so, may access the change event entry from change event queue 124 to determine information about the change event.

Action processor 234 may determine an action process to execute based on a type of change event. In some embodiments, an action process class may be defined for one or more change event classes. For a change event, action processor 234 may determine an action process class based on a change event class, which can be determined based on a type of change event. In some embodiments, data stores 160 may store information indicating an association between action process classes and one or more types of change events. To schedule an action process, a computing node may establish an instance (e.g., an action process object described below with reference to FIG. 6) of the action process class. The action process object may be used to invoke an action process (e.g., a routine) for the action process.

Scheduler 236 may instruct one or more of computing nodes 222 to execute an action process for change events on change event queue 124. In some embodiments, scheduler 236 may request a different computing node to execution an action process for each change event entry on change event queue 124.

In some embodiments, scheduler 236 may assess a processing load of each of computing nodes 222. A processing load of a computing node may be defined based on a value that indicates the processing capabilities of that computing node and/or the current amount of work that is processed by that computing node. In some embodiments, one or more third party systems may be used to determine a value that indicates the processing load of a computing node. For example, one or more load balancer systems may be implemented to determine a load of computing nodes 222.

A processing load may be determined by computing a variety of measurements. The measurements, individually or collectively, may indicate the processing load of the computing node. In one example, a processing load of a computing node may be determined by computing a value that indicates the number of change events that a computing node can manage. In another example, a processing load of a computing node may be determined by computing the number of action processes that are being executed by the computing node. A processing load of a computing node may be determined based on the number of remote devices with which the computing node is communicating.

Scheduler 236 may select a set of computing nodes (e.g., one or more computing nodes) that may perform an action process for a change event entry. One or more computing nodes from the set of computing nodes may be chosen to execute an action process for a change event. The set of computing nodes may be selected from a plurality of computing nodes. The set of computing nodes may include one or more computing nodes. For example, device access management system 120 may select a set of computing nodes (e.g., a set of computing nodes including computing nodes 222-1 and 222-2) from computing nodes 222.

The set of computing nodes may be selected based on a processing load of each of a plurality of computing nodes. Each of the set of computing nodes may be selected for that set based on a processing load threshold. In some embodiments, each of the computing nodes selected for a set of computing nodes may have a processing load that satisfies the processing load threshold. In one example, the processing load threshold may be defined based on a threshold number of change events that a computing node can process. In another example, the processing load threshold may be defined based on an action process threshold defined as a threshold number of actions processing a computing node has initiated. In this example, each computing node of the set of computing nodes may be selected based on the processing load threshold, such that the processing load for each computing node of the set of computing nodes satisfying the action process threshold.

In an enterprise system having thousands of remote devices accessing the enterprise system, some computing nodes may be overloaded with requests and may be unresponsive to the other runtime traffic that it needs to handle from remote devices. Selecting a set of computing nodes based on a processing load may increase processing efficiency for communication of change events to remote devices. Computing nodes that have more available computing resources can be utilized to communicate change events to remote devices. Further, by defining change events based on their types and an action process corresponding to those types of change events, computing nodes can be added without additional configuration to enable those computing nodes to handle processing of the different types of change events. New change events and corresponding action processes can be defined as new types of change events are identified.

In some embodiments, change event handler 232 may create multiple change event entries for one change event. To utilize multiple computing nodes to balance the load for performing an action process to communicate the change event to remote devices affected by the change, multiple change event entries may be created. The number of change event entries may be created based on the set of computing nodes selected to perform the action process. Each of the computing nodes utilized to communicate the change event may access a different one of the change event entries that are created. A change event entry may indicate a set of remote devices to be informed about the change event. Each of the remote devices in a set of remote devices for one change event entry may be different from each of the remote devices in a set of remote devices for another change event entry created for the same change event. One set of remote devices indicated by one change event entry for a change event may contain a different number of remote devices than another set of remote devices for another change event entry for the same change event.

The number of remote devices indicated in a change event entry may be chosen using a variety of techniques. For example, the number of remote devices in a set of remote devices for a change event entry may be chosen based on the number of device identifiers in a page of memory. The page of memory may correspond to storage of device identifiers in device registry 162. The device identifiers identified in a page of memory may be stored in the change event entry and may be used by a computing node to identify a registered remote device for an action process. In some embodiments, the number of remote devices for a change event entry may be chosen based on the number of computing nodes selected to perform the action process. A set of computing nodes may be chosen from computing nodes 222 based on a processing load of each of computing nodes 222. Based on the number of computing nodes, the remote devices to be notified about the change event may be distributed evenly amongst the change event entries. In some embodiments, the processing load of each of the set of computing nodes may be considered when determining the number of remote devices to indicate in a change event entry.

Upon selecting one or more computing nodes to execute an action process for a change event identified by a change event entry, a selected computing node may handle communication of the change event to remote devices. In some embodiments, the modules and subsystems in device access management system 120 may be configured for operation by each of computing nodes.

Each of computing nodes 222 may communicate with remote devices through a communication system. Through the communication system, messages may be communicated between each of computing nodes 222 and one or more remote devices, e.g., endpoint devices 210 and endpoint devices 212. The communication system may provide services to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging services may include email services such as Gmail™ (a service of Google Inc.) and Yahoo!® Mail (a service of Yahoo! Inc.). Other examples may include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.). The communication system may provide web-based client interfaces, dedicated application programs, application program interfaces (APIs), and/or other tools for facilitating communication between device access management system 120 and remote devices.

The communication system may communicate with remote devices via one or more communication networks of various types. Examples of communication networks include, without restriction, the Internet, a WAN, a LAN, an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

In some embodiments, the communication system may implement or use a push notification service (e.g., Apple push notification service provided by the Apple® corporation or Google notification service provided by the Google® corporation). The push notification service may facilitate communication with remote devices (e.g., endpoint devices 210 and endpoint devices 220).

For a change event entry, change event handler 232 may instantiate a change event object based on the change event identified by the change event entry. A change event object may include metadata that identifies the change event and the remote devices to be notified about the change event.

Action processor 234 may determine an action process to execute based on a type of change event. In some embodiments, an action process class may be defined for one or more change event classes. For a change event, action processor 234 may determine an action process class based on a change event class, which can be determined based on a type of change event. In some embodiments, data stores 160 may store information indicating an association between action process classes and one or more types of change events. To schedule an action process, a computing node may establish an instance (e.g., an action process object described below with reference to FIG. 6) of the action process class. The action process object may be used to invoke an action process (e.g., a routine) for the action process. The action process may include communication information about a change event (e.g., a change event object) to one or more remote devices (e.g., endpoint devices 210 and endpoint devices 212).

When executing an action process, a computing node may use the communication system to send a notification to a remote device about a change event identified by a change event entry. A notification may be sent asynchronously to remote devices. A remote device may regularly check with the communication system (e.g., send a pull request to a notification service implemented by the communication system) to determine whether any change events have occurred that affect the remote device. The remote device may communicate a pull request to the communication system to obtain information about the change event. In some embodiments, a notification may activate (e.g., wakeup) the endpoint device to cause it to obtain information about the change event. The communication system may access the change event entry corresponding to the change event from change event queue 124. In some embodiments, the communication system may communicate with one of computing nodes 222 to obtain information from a change event entry corresponding to the change event indicated by the pull request from an endpoint device. The communication system may communicate with a computing node that sent a notification to the endpoint device about the change event indicated by the pull request.

Each remote device may include a secure container application that is configured to communicate with device access management system 120 including computing nodes 222. The secure container application may have access to information included in data stores 160 such as information about change event classes and action process classes. In some embodiments, the secure container application can determine an action process to implement for a change event identified by a change event object transmitted from one of computing nodes 222. In some embodiments, the secure container application may be configured to execute one or more operations (e.g., change a policy, update an application, or adjust a setting) based on an instruction from a computing node about a change event. The secure container application may be configured to communicate with the communication system to receive notifications about a change event and in response, communicate a pull request for information about the change event. In some embodiments, the secure container application may be configured to check with the communication system to determine whether any change events have occurred. The communication system may send information about change events to a remote device if the change events have not been communicated to a remote device. The information may be sent in response to a request for change events.

Each of computing nodes 222 (e.g., computing node 222-1, computing node 222-2, . . . computing node 222-N) may have a runtime environment (e.g., runtime 224, runtime 226, . . . runtime 228). A runtime environment may include multiple execution threads (e.g., a pool of threads) for executing processes. In the example shown in FIG. 2, computing node 222-1 and computing node 222-2 may each concurrently execute an action process for different change events. For example, computing node 222-1 and computing node 222-2 may execute, on a thread (e.g., thread 1) an action process 1 for a change event 1 corresponding to a change event entry 202 on change event queue 124. To improve processing efficiency for communication to change event 1 to endpoint devices 210, 212, action process 1 may be executed on computing node 222-1 for endpoint devices 210 and action process 1 may be executed on computing node 222-2 for endpoint devices 212. After change event 2 is added to change event queue 124, a computing node, such as computing node 222-1 may be scheduled to execute action process 2 on for change event 2. Action process 2 may be executed on thread 2 concurrently with action process 1 executed on thread 1. After change event 3 is added to change event queue 124, a computing node, such as computing node 222-2 may be scheduled to execute action process 3 on for change event 3. Action process 3 may be executed on thread 2 concurrently with action process 1 executed on thread 1.

A computing node may remove a change event entry from change event queue 124 when that computing node has completed the action process for the remote devices identified in the change event entry. A change event entry may persist on change event queue 124 until the action process has completed for all remote devices identified in the change event entry. In this manner, the change event entry is persistent and remains on change event queue 124. In one example, the change event entry may remain on change event queue 124 until all of the remote devices have received information about the change event identified by the change event entry. In another example, the change event entry corresponding to the change event remains on change event queue 124 in the event that a remote device does not receive a change event indicated by the change event entry or the remote device does not return an acknowledgement to a computing node that initiated an action process invoked for a change event. By maintaining a change event entry on change event queue 124, device access management system 120 can ensure that all remote devices receive notification and take action for a change event. By initiating an action process for a change event on different computing nodes for different remote devices, processing or execution delays can be avoided. One computing node is not prevented from processing a change event entry due to remote devices that are unresponsive (e.g., a remote device that is unable to acknowledge a change event or a remote device is unable to receive a notification about the change event).

FIG. 3 illustrates a sequence of operations 300 for initiating an action process for a change event according to some embodiments of the present invention. In this example, a plurality of remote devices (e.g., endpoint devices 312, 314, 316, 318) may be enrolled for access to an enterprise system, e.g., enterprise computer system 150.

Device access management system 120 may implement change event queue 124 to manage change events in a persistent fashion to ensure that remote devices affected by change events are notified. For each of the change event entries on change event queue 124, one of computing nodes 222 may initiate an action process based on a type of the change event indicated by the change event entry. An action process may be identified based on an association with a type of change event. The action process may include notifying the remote devices affected by the change event and in some instances, causing the remote devices to adjust their access to the enterprise system based on the change event. Examples of action processes are described with reference to FIG. 6.

The sequence of operations 300 may be initiated one or more operations 318 performed by device access management system 120. Device access management system 120 may determine that a change event ("change event 1") has occurred for a change in access to an enterprise system for each of endpoint devices 312, 314, 316, 318. A device registry (e.g., device registry 162) may be accessed for information about endpoint devices registered to access an enterprise system. Device access management system 120 may use the information about registered endpoint devices to determine the endpoint devices affected by the change event. Device access management system 120 may identify a type of the change event corresponding to the type of change in access. The type of change event may be determined based on information in change events data store 164, which includes information defining the types of change events.

Device access management system 120 may create a data structure (e.g., a change event entry) to store information about the change event. In some embodiments, device access management system 120 may create multiple change event entries for one change event. For example, change event entry 302 and change event entry 304 may be created for change event 1. Change event entry 302 may indicate a set of devices 306 including endpoint device 312 and endpoint device 314. Change event entry 304 may indicate a set of devices 308 including endpoint device 316 and endpoint device 318. Each of change event entries 302, 304 may be added to change event queue 124, where it can be accessed later by a computing node for determining an action process to initiate for the change event.

In some embodiments, device access management system 120 may select a set of computing nodes from computing nodes 222 to perform an action process ("action process 1") for change event 1. The set of computing nodes may be selected based on a processing load of each of computing nodes 222. For example, device access management system 120 may select a set of computing nodes including computing nodes 222-1 and 222-2 from computing nodes 222.

Device access management system 120 may perform one or more operations to schedule change event 1 for handling by the selected set of computing nodes (e.g., computing node 222-1 and computing nodes 222-2). For example, device access management system 120 may schedule 320 computing node 222-1 to handle change event entry 302 and may schedule 322 computing node 222-2 to handle change event entry 304.

Upon scheduling of change event 1, each of computing node 222-1, 222-2 may perform operations to handle processing for a change event entry corresponding to change event 1. Computing node 222-1 may perform processing to handle change event entry 302 and may computing node 222-2 may perform processing to handle change event entry 304. Computing node 222-1 may perform processing concurrently with computing node 222-2.

Each of computing nodes 222-1 and computing nodes 222-2 may instantiate a change event object based on a change event class corresponding to the type of change event for change event 1. A change event object for change event 1 may include persisted metadata that defines the change event 1 in a change event entry (e.g., change event entry 302 and change event entry 304). In other words, the information included in a change event entry for change event 1 may be included in a change event object that is instantiated for change event 1. For example, a change event object may include device identifiers of devices identified in a change event entry.

Each of computing nodes 222-1 and computing nodes 222-2 may establish an action process object for change event 1. An action process class may be identified based on the type of change event indicated by a change event entry for change event 1. An action process class may include an execution routine (e.g., run( ) routine) that defines the action process a computing node is to perform. The routine may be executed by a computing node on a processing thread available for that computing node. The action process may include communicating information about the change event to endpoint devices identified in a change event object for a change event entry. The information may include instructions for an endpoint device to perform to adjust operation for the change event. The action process may be performed for each endpoint device identified in the change event object for a change event. The action process may be performed concurrently for multiple endpoint devices.

Each of computing nodes 222-1 and computing nodes 222-2 may instantiate an action process object for the change event 1. An action process object may be instantiated by a computing node for a change event object instantiated by that computing node. An action process object may be instantiated based on the action process class corresponding to the type of change event. A change event object may be passed to a routine executed for the instantiation of the action process object. Examples of an action process object and action process class are described below with reference to FIG. 6.

Each of computing nodes 222-1 and 222-2 may initiate action process 1 by invoking the execution routine for the action process class identified based on the type of change event for change event 1. The execution routine may be invoked by a computing node calling the execution routine for an action object instantiated by the computing node. Action process 1 may be invoked by computing node 222-1 for each endpoint device in set of devices 306. Action process 1 may be invoked by computing node 222-2 for each endpoint device in set of devices 308. Action process 1 may include communicating information about change event 1 to each endpoint device in a set of devices. The information about a change event may be communicated to a remote device as a notification. The notification may be communicated through a communication system that supports a notification service (e.g., a push notification service). In some examples, notifications may be communicated in a different order (e.g., asynchronously) that an order shown in FIG. 3. A remote device may communicate with the communication system (e.g., send a pull request) to obtain information about a change event identified by a notification. Computing node 222-1 may communicate 324, 326 information about change event 1 to each endpoint device in set of devices 306. Computing node 222-2 may communicate 328, 330 information about change event 1 to each endpoint device in set of devices 308. The information communicated to an endpoint device may include an instruction or information for adjusting operating of the endpoint device according to the change event.

In some embodiments, a computing node may receive communications from an endpoint device when the endpoint device has completed operations for an action process. Operations for an action process may be completed when the endpoint devices have been notified about a change event and have performed actions to adjust access for the change event. For example, computing node 222-1 may receive, from endpoint device 314 of set of devices 306, an acknowledgement 332 indicating that action process 1 has been completed for endpoint device 314. For example, computing node 222-2 may receive, from endpoint device 316 and endpoint device 318 of set of devices 308, an acknowledgement 334 and an acknowledgement 336, respectively, indicating that action process 1 has been completed for endpoint devices 316, 318. Communications (e.g., acknowledgements) from remote devices may be received asynchronously from an order in which the communications are sent from different endpoint devices.

A computing node may remove a change event entry from change event queue 124 when that computing node has completed the action process for the endpoint devices identified in the change event entry. In the example shown in FIG. 3, computing node 222-1 may perform operations 340 to determine whether the action process has completed for each endpoint device in set of devices 306. Because endpoint device 312 of set of devices 306 has not communicated acknowledgement for change event 1, computing nodes 222-1 may refrain from removing change event entry 302 from change event queue 124. Change event entry 302 is not removed from change event queue 124 and persists on change event queue 124 until endpoint device 312 indicates acknowledgement of change event 1.

In some embodiments, computing node 222-1 may indicate a status of a change event in change event entry 302. Computing node 222-1 may attempt to retry execution of action process 1 for endpoint devices (e.g., endpoint device 312) that are unresponsive. The number of retries may be determined based on change event entry 302, which is defined by device access management system 120. Upon determining that the number of retries has been reached for retrying execution of an action process, computing node 222-1 may remove (e.g., de-queue) change event entry 302 from change event queue 124. Computing node 222-1 may store information in an error log (e.g., a server audit record) indicating that an action process was not completed for endpoint device 312.

Computing node 222-1 may transmit result information 342 indicating a result of action process 1 for change event 1. Result information 342 may indicate a status of acknowledgement regarding action process 1 for endpoint devices identified in change event entry 302. For example, result information 342 may indicate that acknowledgement was received from endpoint device 314 and was not received from endpoint device 312. Result information 342 may indicate endpoint devices that have received notification about change event 1.

In some embodiments, subsequent attempts to retry execution of an action process may be performed by a different computing node. Upon receipt of result information 342, device access management system 120 may schedule 344 another computing node (e.g., computing node 222-2) to retry execution of an action process 1 that was not completed for change event 1.

Upon determining that each endpoint device of a set of endpoint devices has indicated acknowledgement for a change event, a computing node may remove a change event entry from change event queue 124 and send result information to device access management system 120. For example, upon receiving acknowledgements 334, 336, computing node 222-2 may remove change event entry 304 from change event queue 124 and may transmit result information 346 to device access management system 120. Result information 346 may indicate that action process 1 was completed for change event entry 304.

Device access management system 120 may perform operations 348 to schedule one or more computing nodes 222 to perform action processes for additional change events that occur in an enterprise system. For example, FIG. 4 illustrates a sequence of operations 400 for initiating an action process for a change event according to some embodiments of the present invention. In particular, FIG. 4 illustrates an example of a second change event ("change event 2") that is identified by device access management system 120 after change event 1 is identified by device access management system 120. In this example, operations 400 may occur after operations 300 have been performed in the example illustrated in FIG. 4. In some embodiments, all or some of operations 400 may occur concurrently with operations 300 based on when change event 2 is determined.

Continuing from the example in FIG. 3, change event entry 302 may persistently remain on change event queue 124 until all endpoint devices (e.g., endpoint devices 312, 314) identified in change event entry 302 have received information about change event 1. A change event entry may remain on the change event queue until all devices affected by the change event corresponding to the change event entry have been notified about the change event. In some embodiments, the change event may be retransmitted to remote devices to retry communication of the change event. A change event entry, such as change event entry 302, may remain on change event queue 124 even after another change event (e.g., change event 2) is identified. Device access management system 120 may perform processing to notify remote devices, e.g., endpoint devices 314, 316, 318, affected by change event 2.

Computing node 222-1 may perform operations 422 to retry execution of action process 1 for change event 1 to notify endpoint device 312 about change event 1. Execution of action process 1 may be retried since acknowledgement was not received from endpoint device 312 on a previous attempt to notify endpoint device 312 about change event 1. Action process 1 may include communicating 424 information about change event 1 to endpoint device 1.

The information about a change event may be communicated to a remote device as a notification. The notification may be communicated through a communication system that supports a notification service (e.g., a push notification service). In some examples, notifications may be communicated in a different order (e.g., asynchronously) that an order shown in FIG. 3. A remote device may communicate with the communication system (e.g., send a pull request) to obtain information about a change event identified by a notification.

Operations 400 may include device access management system 120 processing change event 2 to notify endpoint devices 314, 316, 318 affected by change event 2. In this example, device access management system 120 may create two change event entries 406, 408 to balance the process load for communication of change event 2 to endpoint devices 314, 316, 318. Change event entry 406 may be created for endpoint device 314. Change event entry 408 may be created for a set of endpoint devices 410 including endpoint devices 316, 318.

Device access management system 120 may select a set of computing nodes (e.g., computing nodes 222-1, 222-2) to notify endpoint devices 314, 316, 318 about change event 2. Device access management system 120 may schedule 430 computing node 222-1 to handle an action process (e.g., action process 2) for change event entry 406 and may schedule 450 computing node 222-2 to handle action process 2 for change event entry 408. In some embodiments, computing nodes 222 and device access management system 120 may concurrently handle processing for multiple change events when those change events do not conflict or dependent on each other. For example, change events may conflict when they are related to changes in the same policy.

Upon scheduling of change event 2, computing node 222-1 may perform processing to handle change event entry 406 and computing node 222-2 may perform processing to handle change event entry 408. Each of computing nodes 222-1 and computing nodes 222-2 may instantiate a change event object based on a change event class corresponding to the type of change event for change event 2. Each of computing nodes 222-1 and computing nodes 222-2 may establish an action process object for change event 2.

Using the established action process object, action process 2 may be invoked by computing node 222-1 for endpoint device 314 and may be invoked by computing node 222-2 for each endpoint device in set of devices 410. For action process 2, computing node 222-1 may communicate 434 information about change event 2 to endpoint device 314. Computing node 222-2 may communicate 452, 454 information about change event 2 to each endpoint device in set of devices 410. Computing node 222-1 may receive, from endpoint device 314, an acknowledgement 440 indicating that action process 2 has been completed for endpoint device 314. Computing node 222-2 may receive, from endpoint devices 316, 318 of set of devices 410, an acknowledgement 456, 458, respectively, indicating that action process 2 has been completed for endpoint devices 316, 318. Communications (e.g., acknowledgements) from remote devices may be received asynchronously from an order in which the communications are sent from different endpoint devices.

In some embodiments, a computing node may receive communication (e.g., an acknowledgement) from an endpoint device regarding one action process after the computing node has begun processing for a different action process. For example, computing node 222-1 may receive an acknowledgement 438 from endpoint device 312 after computing node 222-1 has begun processing for action process 2. Acknowledgement 438 may be received for a retry of action process 1. Although shown in a particular sequence, acknowledgement 438 may be received before, after, or concurrently with communication between computing node 222-1 and endpoint device 314 for action process 2.

Computing node 222-1 may determine whether action process 1 has completed for endpoint device 312. Upon receiving acknowledgement 438, computing node 222-1 may remove change event entry 302 from change event queue 124 and may transmit result information 436 to device access management system 120. Result information 436 may indicate that action process 1 was completed for change event entry 302.

Computing node 222-1 may determine whether action process 2 has completed for endpoint device 314. Upon receiving acknowledgement 440, computing node 222-1 may remove change event entry 406 from change event queue 124 and may transmit result information 442 to device access management system 120. Result information 442 may indicate that action process 2 was completed for change event entry 406.

Computing node 222-2 may determine whether action process 2 has completed for endpoint devices 316, 318. Upon receiving acknowledgement 456, 458, computing node 222-2 may remove change event entry 408 from change event queue 124 and may transmit result information 460 to device access management system 120. Result information 460 may indicate that action process 2 was notified for change event entry 408.

Device access management 120 may perform operations 462 to handle processing for additional change event entries, if any, on change event queue 124. Operations 400 may end when change event queue 124 is empty.

Figure 5:
FIG. 5 depicts an example of a data structure for storing information about a change event according to some embodiments of the present invention.

FIG. 5 depicts example of a data structure 510 for storing information about a change event according to some embodiments of the present invention. In particular, data structure 510 may store information for a change event entry. Data stored in a change event entry may include metadata about a change event. In some embodiments, an instance of a data structure 510 ("change event object") may be created for each different change event. As explained above, the change event entry may be managed on a queue (e.g., change event queue 124) for a computing node to perform an action for the change event indicated by the change event entry. A computing node may determine operations to perform (e.g., initiate an action process) based on information stored in a change event entry. In some embodiments, a change event object may be created based on information included in data structure 510 for a change event entry. Examples of a change event entry may include change event entry 302, change event entry 304, change event entry 406, and change event entry 408. In some embodiments, a change event object may be a plain old Java® object defined based on a Java® class In some embodiments, data structure 510 may be defined based on a metadata class ("change event class"). A metadata class may define the type of information stored for a change event. The metadata class may define one or more fields of information for a change event to identifying a unique change event. The metadata class may be a template class that defines the type of information stored for any type of change event. Data structure 510 may be implemented for different types of change events. In some embodiments, a metadata class may be defined for each different type of change event. A change event object may be a metadata object that is represented by data structure 510. The data stored in data structure 510 for a change event object may include metadata. The metadata may include data obtained from a change event entry. A change event object may be created by instantiating a change event class for a type of change event. A data structure 510 representing a change event object may include the type of information defined by the change event class that was instantiated.

Data structure 510 may be implemented as one or a combination of different types of data structures including, without restriction, an array, a record, a relational database table, a hash table, a linked list, or other types of data structures. For purposes of illustration, data structure 510 is shown in an arrangement with a particular number of fields; however, data structure 510 may be defined by more or fewer fields in different arrangement than shown. Each instance of data structure 510 may be stored in a data store such as change events 164.

In the example shown in FIG. 5, data structure 510 may include a field 512 ("type of Change Event") that includes information indicating a type of change event. Examples of types of change events may include, without restriction, a policy change, application change, or synchronization settings change.

Field 514 ("Change") in data structure 510 may include information indicating details about the change. For example, field 514 may indicate the policy that is changed for a policy change. In some embodiments, field 514 may include or reference information related to the change. For example, when a policy has changed, field 514 may include a reference to a revised policy that has changed. Information in field 514 may be included in a change event object that is created for the change event.

Data structure 510 may include a field 516 ("Change Event Status") that includes information indicating a status of communicating the change event to a remote device. A computing node may use information in field 516 to determine a status of the action process performed for the change event. Examples of the change event status may include, without restriction, pending, error, retry, or acknowledged. For example, the computing node may determine whether each of the remote devices identified by devices 520 have acknowledged the change event communicated to the remote devices for the action process. A computing node may determine whether to retry initiating an action process for the change event based on the change event status. The computing node may update field 516 with information indicating the status of the change event.

Data structure 510 may include a field 518 ("Device(s)") that includes device information (e.g., a device identifier) of each remote device in a set of remote devices for which an action process is to be performed for the change event. The device information may be obtained from a device registry for each of the set of remote devices. The device information may be identified based on an association with an identity of a user registered with an enterprise system.

Data structure 510 may include a field 520 ("Retry Configuration") that indicates a configuration for retrying the action process for the change event. The retry configuration may be based on various factors, such as a type of change event. The retry configuration may indicate the number of times the action process may be attempted. A computing node and device access management system 120 may use retry configuration to determine whether to invoke an action process again for a change event that was not acknowledged by a remote device.

Figure 6:
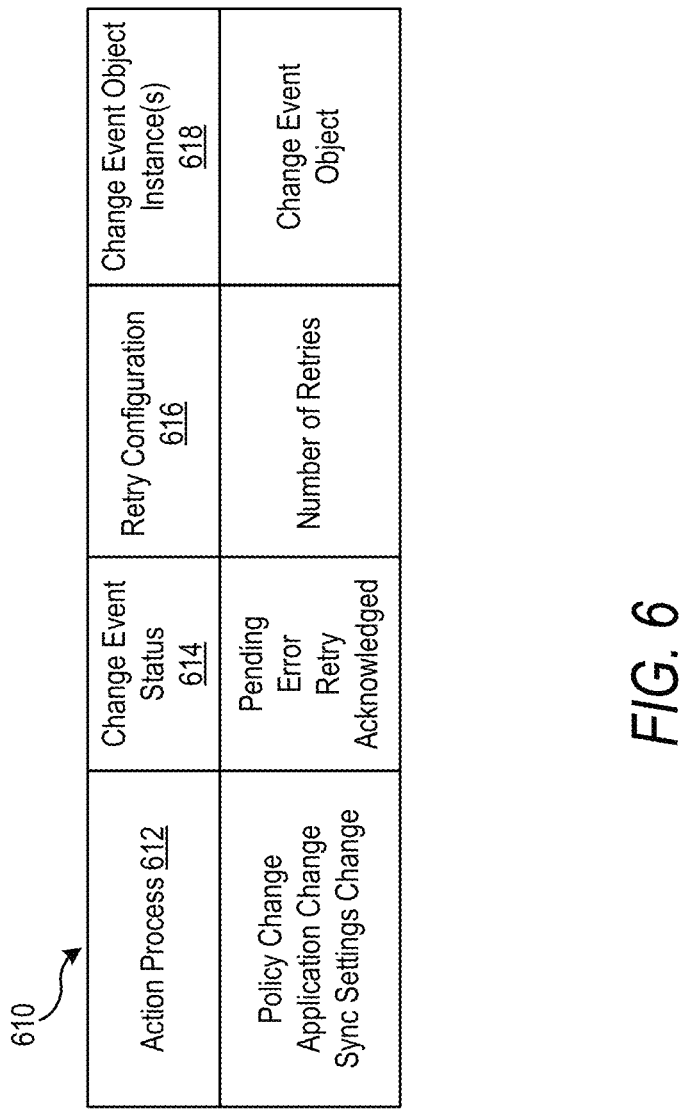
FIG. 6 depicts an example of a data structure representing an action process object according to some embodiments of the present invention.

FIG. 6 depicts an example of a data structure 610 representing an action process object according to some embodiments of the present invention. Data structure 610 may store information about an action process for a change event. Data structure 610 may be instantiated as an action process object corresponding to a change event. In some embodiments, data structure 610 may be created based on a class ("action process class"). An action process class may be defined as a Java® class. An action process object may be a plain old Java® object instantiated based on an action process class defined as a Java® class. Action process classes may be stored in a data store such as action processes data store 166 of FIG. 1. An action process class may define one or more fields of information that can be stored in an action process object instantiated based on the action process class.

In some embodiments, a different action process class may be defined for each different action process corresponding to a type of change event. In some embodiments, a different action process class may be defined for each different type of change event. Multiple action classes may be defined for a single type of change event, where different action processes may be executed for the type of change event.

Data structure 610 may be implemented as one or a combination of different types of data structures including, without restriction, an array, a record, a relational database table, a hash table, a linked list, or other types of data structures. For purposes of illustration, data structure 610 is shown in an arrangement with a particular number of fields; however, data structure 610 may be defined by more or fewer fields in different arrangement than shown. Each instance of data structure 610 may be stored in a data store such as action processes data store 166.

Field 612 in data structure 610 may include information identifying an action process to be performed for a type of change event corresponding to the action process object. Examples of an action process may include, without restriction, a policy change process, an application change process, and a synchronization setting change. An action process may be different depending on the type of change event for which the action process is performed. In some embodiments, different action processes may be defined for a single type of change event, where different changes may be associated with the type of change event.

Data structure 610 may include a field 614 ("Change Event Status") that includes information indicating a status of communicating the change event to a remote device. A computing node may use information in field 614 to determine a status of the action process performed for the change event. Examples of the change event status may include, without restriction, pending, error, retry, and acknowledged. For example, the computing node may determine whether each of the remote devices has acknowledged the change event communicated to the remote devices for the action process. The remote devices may be identified by a change event object passed to an action process when initiated. The computing node may determine whether to retry initiating an action process for the change event based on the change event status.

An action process may be defined by one or more routines in an action process class. The routines may include code (e.g., instructions) to perform an action process. The routines may be invoked using an action process object instantiated based on the action process class. For example, an action process class may include an execution routine (e.g., a run( ) routine), which when invoked for an action process object initiates the execution routine. In some embodiments, the execution method may accept a change event object indicating information about a change event. The execution method may use the information in a change event object to perform an action process for the change event.

The action process class may include one or more routines that are specific to a change in access associated with a type of change event. Some routines may include code that instructs an action process for a remote device to perform for a change event. One routine may include code to transmit the change event to a remote device and to instruct the remote device to perform an action process for the change event. For example, when field 612 indicates a policy change, the action process may include changing a policy on a remote device. One routine may transmit information about the change event to a remote device and a policy to be changed on the remote device.

Below is an example of an action process class:

```
ActionProcessors :
public class PolicyUpdateProcessor extends AbstractEventProcessor {
  @Override
    public void run( ) {
      long threadId = Thread.currentThread( ).getId( );
      try{
        logger.fine("Policy Update process starting - Thread ID "
            + threadId);
        execute( );
        logger.fine("Policy Update process completed - Thread ID "
            + threadId );
      } catch(Throwable ex) {
        logger.logp(Level.SEVERE, PolicyUpdateProcessor.class.getName( ),
            "run","Execute operation Failed with ", ex);
      }
    }
  setTaskFailed( ) { };
  setTaskCompleted( ) { };
}
```

In the example above, invoking an execution routine (e.g., run ( )) may initiate an action process that includes updating a policy at a remote device. The execution routine may invoke other routines defined by the action class. In some embodiments, an action process class may include an application programming interface (API) with one or more additional routines related to an action process. The routines may be invoked by the action process class for an action process object instantiated for that class. Examples of routines may include "setTaskFailed ( )" and "setTaskCompleted( )." These routines may cause information to be stored in data structure 610 about an action process. For example, setTaskFailed ( ) may be invoked to store information in an action process object indicating a change event status of "error" in field 614. In another example, setTaskCompleted( ) may be invoked to indicate a change event status of "acknowledged" in field 614. The execution method can determine execution for an action process based on a change event status indicated by field 614 in an action process object used to invoke the execution method.

Data structure 610 may include a field 616 ("Retry Configuration") that indicates a configuration for retrying the action process for a change event. The retry configuration may be based on various factors, such as a type of change event. The retry configuration may indicate the number of times the action process may be attempted. A computing node and device access management system 120 may use retry configuration to determine whether to invoke an action process again for a change event that was not acknowledged by a remote device.

Field 618 of data structure 610 may include a change event object. Field 618 may indicate a reference in storage to a change event object or may include information in the change event object itself. A change event object passed to an execution method may be stored using field 618. A computing node may update a change event status in a change event object referenced in field 618. In some embodiments, an execution method in an action class may access information in the change event object referenced from field 618.

Figure 7:
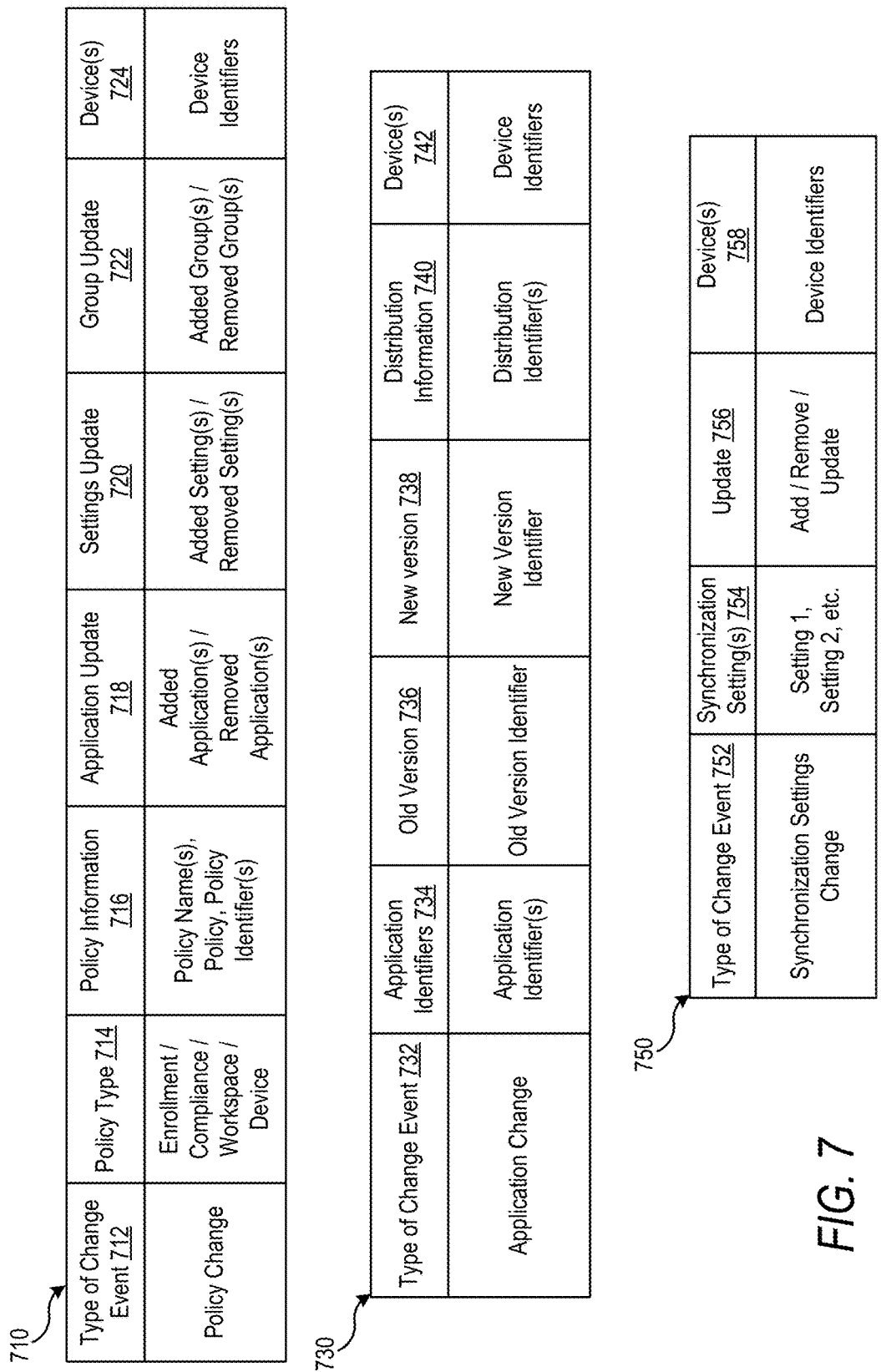
FIG. 7 depicts an example of data structures representing different types of change event objects according to some embodiments of the present invention.

FIG. 7 depicts an example of data structures 710, 730, 750 representing different types of change event objects according to some embodiments of the present invention. Each of data structure 710, 730, 750 represents an example of a change event object including information about a change in access to an enterprise system. As explained above, information about a change event object may be transmitted to each remote device affected by a change event identified by the change event object. In some embodiments, a change event object may be transmitted to provide information about the change event. The information in the change event object may be used to determine operations for a remote device to perform to adjust access to an enterprise system according to the change indicated by the change event object.

A change event object may be defined based on a metadata class. A change event object may be instantiated based on the metadata class. A data structure such as any of data structures 710, 730, 750 may be created as a change event object based on the metadata class that is instantiated. A metadata class may define the type of information stored in a change event object instantiated based on that metadata class. A different metadata class may be defined for each type of change event. A change event object may include one or more fields of information about a change event. The fields may be defined based on the metadata class from which the change event object is instantiated. As such, a change event object may include fields defined based on a metadata class for a type of change event. Examples of different metadata classes are described below. In some embodiments, a change event object may be a plain old Java® object defined based on a Java® class.

Each of data structures 710, 730, 750 may be implemented as one or a combination of different types of data structures including, without restriction, an array, a record, a relational database table, a hash table, a linked list, or other types of data structures. For purposes of illustration, data structures 710, 730, 750 are shown in an arrangement with a particular number of fields; however, data structures 710, 730, 750 may be defined by more or fewer fields in different arrangement than shown. Each instance of one of data structures 710, 730, 750 may be stored in a data store such as change events data store 164.

Data structure 710 is an example of a change event object for a type of change event categorized as a policy change. Field 712 ("type of change event") in data structure 710 may include information identifying a "policy change" as one type of change event. Examples of a policy change may include, without restriction, a change in a compliance policy, a change in an enrollment policy, a change in a workspace policy, and a change in a device policy.

Below is an example of a metadata class ("Policy Change Class") defined for a policy change:

```
@XmlRootElement
@XmlAccessorType(XmlAccessType.FIELD)
public class PolicyChange implements ChangeEvent {
    @XmlElement
    private Set<String> addedApps;
    @XmlElement
    private Set<String> removedApps;
    @XmlElement
    private Set<String> addedSettings;
    @XmlElement
    private Set<String> removedSettings;
    @XmlElement
    private Set<String> addedGrps;
    @XmlElement
    private Set<String> removedGrps;
    private Set<String> policyNames;
    private Set<String> endpointIds;
    private boolean enrollmentPolicyUpdated;
    private boolean compliancePolicyUpdated;
    private boolean workspacePolicyUpdated;
    private boolean devicePolicyUpdated;
    private boolean excludedSubgroupsChanged;
    public PolicyChange( ) {
    }
    public Set<String> getEndpointIds( ) {
        return endpointIds;
    }
    public void setEndpointIds(Set<String> endpointIds) {
        this.endpointIds = endpointIds;
    }
    public EventType getType( ) {
        return EventType.COMPLIANCE_CHECK;
    }
}
```

In some embodiments, a metadata class may include routines to obtain information stored in an object that is instantiated based on the class. For example, the policy change class above may include routines such as getEndpointIds( ), setEndpointIds( ), and getType( ) to obtain information stored in a change event object.

Field 714 ("Policy Type") includes information indicating a type of policy that has changed for accessing an enterprise system. The policy types may be defined in the metadata class from which data structure 710 is instantiated. Examples of types of policies include, without restriction, an enrollment policy, a compliance policy, a workspace policy, and a device policy.

In some embodiments, data structure 710 may include a policy information field 716 ("Policy Information"), which indicates information about a policy that has changed. Field 716 may include, without restriction, a policy name of a policy that has changed, the policy, a policy identifier of the policy, and any other information identifying the policy.

Field 718 ("Application Update") in data structure 710 may include information identifying applications that have changed for the policy change. In some embodiments, the policy change class may define the applications that are added or removed for a policy.

Field 720 ("Settings Update") in data structure 710 may include information identifying settings (e.g., synchronization settings) that have changed for the policy change. In some embodiments, the policy change class may define the settings that are added or removed for a policy.

Field 722 ("Group Update") in data structure 710 may include information identifying user groups that have changed for the policy change. In some embodiments, the policy change class may define the groups that are added or removed for a policy. A user group may be defined as a group of users associated with one or more roles.

Field 724 ("Device Identifiers") in data structure 710 may include device information, such as device identifiers, each of which identifies a remote device affected by the change represented by data structure 710.

Data structure 730 is an example of a change event object for a type of change event categorized as an application change. Field 732 ("type of change event") in data structure 730 may include information identifying an "application change" as one type of change event. Examples of an application change may include, without restriction, adding an application to a catalog of applications accessible to the plurality of remote devices, removing an application from the catalog, modifying a version of an application in the catalog, changing access to the applications, changing access to applications that can be pushed to a remote device, or other type of changes to an application.

Below is an example of a metadata class ("Policy Change Class") defined for a policy change:

```
@XmlRootElement
@XmlAccessorType(XmlAccessType.FIELD)
public class PolicyChange implements ChangeEvent {
    @XmlElement
    private Set<String> addedApps;
    @XmlElement
    private Set<String> removedApps;
    @XmlElement
    private Set<String> addedSettings;
    @XmlElement
    private Set<String> removedSettings;
    @XmlElement
    private Set<String> addedGrps;
    @XmlElement
    private Set<String> removedGrps;
    private Set<String> policyNames;
    private boolean enrollmentPolicyUpdated;
    private boolean compliancePolicyUpdated;
    private boolean workspacePolicyUpdated;
    private boolean devicePolicyUpdated;
    private boolean excludedSubgroupsChanged;
    public PolicyChange( ) {
    }
}
```

Field 734 ("Application Identifiers") in data structure 730 may include information about an identifier of one or more applications that have changed. The application identifiers may be used to reference an application in storage.

Field 736 ("Old Version") in data structure 730 may include an identifier of a version of application before that application changed. Field 738 ("New Version") includes an identifier of a version of application after an application has changed. A remote device can determine whether to update an application based on the version change between the old version and the new version.

Field 738 ("Distribution Information") in data structure 730 may include information about distribution identifiers used to further identify an application that has changed.

Field 740 ("Device Identifiers") in data structure 730 may include device information, such as device identifiers, each of which identifies a remote device affected by the change represented by data structure 730.

Data structure 750 is an example of a change event object for a type of change event categorized as a synchronization settings change. Field 752 ("type of change event") in data structure 750 may include information identifying a "synchronization settings change" as one type of change event.

Field 754 ("Synchronization Settings") in data structure 750 may include information about one or more synchronization settings (e.g., setting 1, setting 2, etc.) that have changed. Examples of settings may include, without limitation, one or more client settings for a secure workspace and/or one or more remote device settings, such as email settings, network settings (e.g., virtual private network settings or Wifi settings). In some embodiments, field 754 may include the settings themselves that have changed or a reference to storage where the change in settings is stored.

Field 756 ("Update") in data structure 750 may include information about the type of change for a synchronization setting. Examples of the type of change include adding a setting, removing a setting, or updating a setting.

Field 758 ("Device Identifiers") in data structure 750 may include device information, such as device identifiers, each of which identifies a remote device affected by the change represented by data structure 750.

Figure 8:
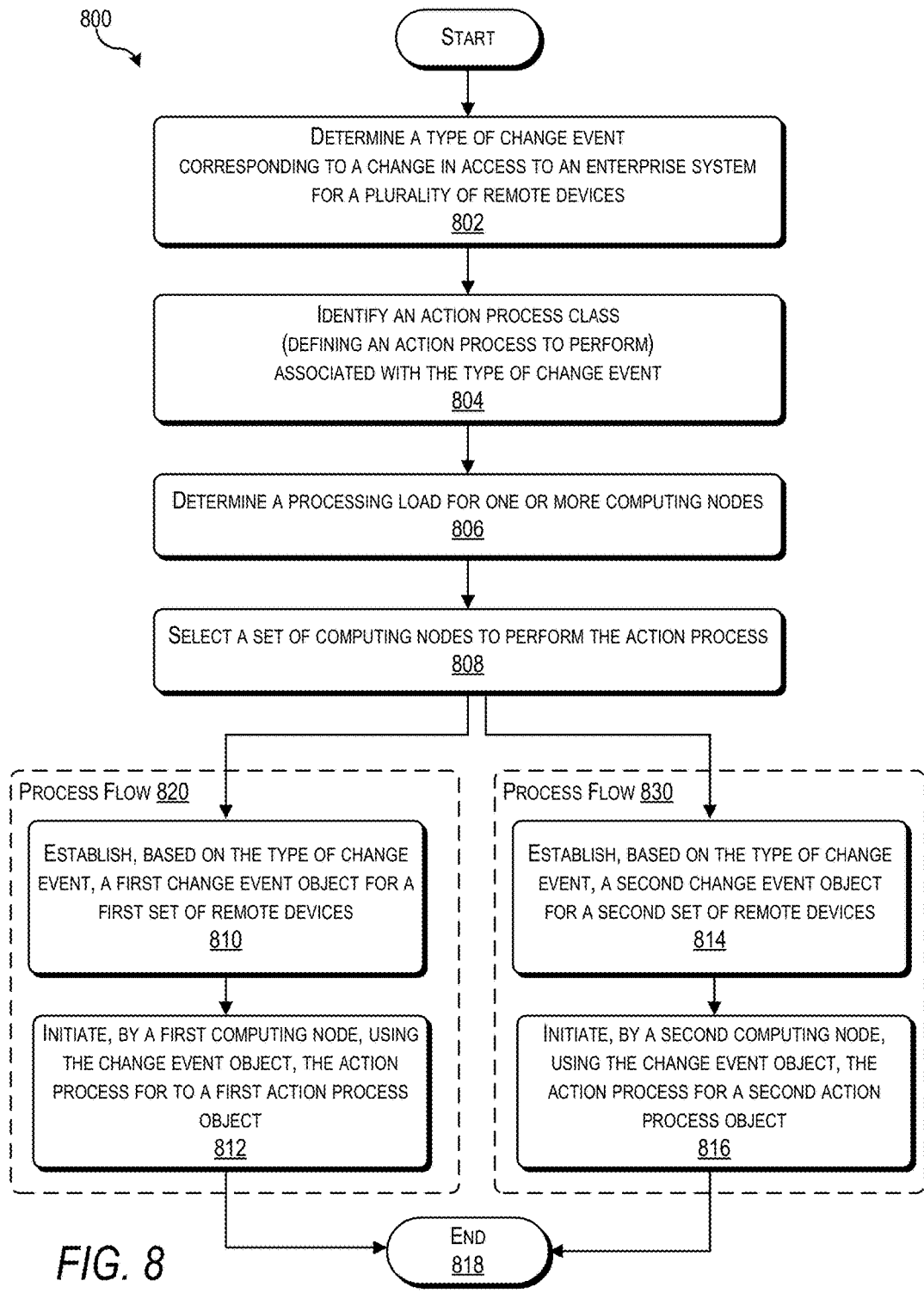
FIG. 8 is a flowchart illustrating a process for communicating change events to remote devices that access an enterprise system according to some embodiments of the present invention.

Now turning to FIG. 8, a flowchart 800 is shown illustrating a process for communicating change events to remote devices that access an enterprise system according to some embodiments of the present invention. In some embodiments, the process depicted in FIG. 8 may be implemented using device access management system 120 and/or one or more computing nodes depicted in FIGS. 1-4.

The process depicted by flowchart 800 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps of flowchart 800 is not intended to be limiting. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. While processing depicted in FIG. 8 is with respect to a single change in access to an enterprise system, the processing may be performed for multiple changes in access to the enterprise system. While processing depicted in FIG. 8 is with respect to a single type of change event corresponding to a change in access to an enterprise system, the processing may be performed for multiple types of change events corresponding to changes in access to the enterprise system. One of ordinary skill in the art would recognize many variations, modifications, and alternatives.

The processing in flowchart 800 is initiated, at step 802, by determining a type of change event corresponding to a change in access to an enterprise system for a plurality of remote devices. For example, device access management system 120 may identify a change event corresponding to a change in access to enterprise computer system 150 and may determine the types of the change event. Device access management system 120 may manage access to an enterprise system. Managing access may include managing compliance policies for the remote devices, managing applications distributed to the remote devices, and/or managing synchronization of settings for communication by the remote devices with the enterprise system.

Types of changes events may include, for example, a policy change, an application change, a change in a synchronization setting related to accessing the enterprise system, or other type of identifiable change related to accessing an enterprise system. A change event may correspond to one or more events, which individually or in combination, correspond to a change in access to an enterprise system using a remote device. In some embodiments, a change event may correspond to multiple types of change events.

One type of change event, for example, is a policy change. Examples of a policy change may include a change in a compliance policy for accessing an enterprise system, a change in an enrollment policy for registering a remote device to access an enterprise system, a change in a workspace policy for a workspace on a remote device that accesses an enterprise system, or a change in a device policy of a remote device that accesses an enterprise system. A change in a policy may be identified when a policy is created, updated, or removed. A change in a policy may be identified as a change event and a type of the change event may be determined when a policy related to access to an enterprise system using a remote device has changed.

Another type of change event, for example, is an application change. Examples of an application change may include adding an application to a catalog of applications accessible to the plurality of remote devices, removing an application from the catalog, modifying a version of an application in the catalog, or other change related to an application that accesses an enterprise system. When an application changes or an application is added to a group of applications accessible to a user of an enterprise system, a change in an application may be identified as a change event.

Yet another type of change event, for example, is a change in a synchronization setting related to accessing an enterprise system. Examples of a change in a synchronization setting may include a change in a time period for synchronization of policies or a change in application synchronization settings.

An action process class associated with a type of change event may be identified at step 804. As explained above, an action process object may correspond to a data structure that stores information defined by an action process class. An action process class may be associated with one or more types of change events. The action process class may define an action process to perform on a remote device for one or more types of change events associated with the action process class. As such, the action process object may be associated with the one or more types of change events that are associated with the action process class from which the action process object is defined. An action process class can be identified based on a type of change event (e.g., the type of change event determined at step 802).

At step 806, a processing load for one or more computing nodes may be determined. For example, device access management system 120 may determine a processing load of each of computing nodes 222. A processing load of a computing node may correspond to a value indicating the processing capabilities of that computing node and/or the current amount of work that is processed by that computing node. In some embodiments, one or more third party systems may be used to determine a value that indicates the processing load of a computing node.

A processing load may be determined by computing a variety of measurements. The measurements, individually or collectively, may indicate the processing load of the computing node. In one example, a processing load may be determined by computing a value that indicates the number of change events that a computing node can manage. In another example, the processing load may be determined by computing the number of action processes (e.g., an action process initiated using an action process object established based on action process class) initiated by the computing node.

A set of computing nodes may be selected to perform an action process for a change in access, at step 808. The set of computing nodes may be selected from a plurality of computing nodes. The set of computing nodes may include one or more computing nodes. For example, device access management system 120 may select a set of computing nodes (e.g., a set of computing nodes including computing nodes 222-1 and 222-2) from computing nodes 222.

The set of computing nodes may be selected based on a processing load (e.g., the processing load determined at step 806) of each of a plurality of computing nodes. Each of the set of computing nodes may be selected for that set based on a processing load threshold. In some embodiments, each of the computing nodes selected for a set of computing nodes may have processing load that satisfies the processing load threshold. In one example, the processing load threshold may be defined based on a threshold number of change events that a computing node can process. In another example, the processing load threshold may be defined based on an action process threshold defined as a threshold number of actions processing a computing node has initiated. In this example, each computing node of the set of computing nodes may be selected based on the processing load threshold, such that the processing load for each computing node of the set of computing nodes satisfying the action process threshold.

Processing for flowchart 800 may continue to one or more process flows, e.g., process flow 820 and process flow 830. The action process (e.g., the action process defined by the action process class identified at step 804) may be implemented for each process flow. Each process flow may be implemented for a set of remote devices of the plurality of remote devices for which access to an enterprise system has changed. Each remote device in a set of remote devices (e.g., set of devices 306) for a process flow (e.g., process flow 820) may be different from each remote device in a set of remote devices (e.g., set of devices 308) corresponding to a different flow (e.g., process flow 830). In some embodiments, the process flows may be executed concurrently with each other.

In the example of FIG. 8, process flow 820 may be implemented for a first set of remote devices (e.g., set of devices 306) of a plurality of remote devices for which a type of change event was determined at step 802. At step 810, a change event object may be established for the first set of remote devices. As explained above, a change event object may correspond to a data structure that stores information. The information stored in a change event object may be defined based on a change event class. A change event object may indicate information about a change in access to an enterprise system. A different change event class may be defined for each of a plurality of types of change events. A change event object may be established based on a type of change event. The change event class corresponding to the type of change event may be used to establish the change event object.

A change event object may be established for a change in access for the first set of devices. A change event entry may be placed on a queue (e.g., a change event queue 124 of FIG. 1) for a set of devices for which access has changed. In some embodiments, a change event entry may be defined as a data structure. The change event entry may indicate the type of information to store for a change event corresponding to a type of change event. For example, a change event entry may be defined, much like a change event object, based on a change event class corresponding to a type of change event for the change in access. The change event entry may include information indicating a change in access for the first set of devices and the type of change event. The change event entry may include information identifying each of the first set of remote devices. Establishing the change event object may include instantiating a change event object based on the change event entry for the first set of remote devices placed on the queue. In some embodiments, the change event object, once established, may include information identifying the set of devices for which the change event object was established.

At step 812, an action process for a first action process object may be initiated. The action process may be defined for an action process class identified at step 804. Instantiating the action process for a first action process object may include establishing a first action process object based on the action process class. The first action process object may be established by instantiating the action process class. During instantiation of the action process class, a change event object, e.g., the change event object established at step 810, is passed to the action process class. Instantiating the action process for a first action process object may include invoking the action process using the first action process object. The action process may be invoked by calling a routine provided in the action process class. The first action process object may be passed to the routine when the action process is invoked.

Process flow 830 may be implemented for a second set of remote devices (e.g., set of devices 308). At step 814, a change event object may be established for the second set of remote devices of a plurality of remote devices for which a type of change event was determined at step 802. A change event object may be established for a change in access for the second set of devices.

At step 816, an action process for a second action process object may be initiated. The action process may be defined for an action process class identified at step 804. Instantiating the action process for a second action process object may include establishing a second action process object based on the action process class. The second action process object may be established by instantiating the action process class. During instantiation of the action process class, a change event object, e.g., the change event object established at step 810, is passed to the action process class. Instantiating the action process for a second action process object may include invoking the action process using the second action process object. The action process may be invoked by calling a routine provided in the action process class. The second action process object may be passed to the routine when the action process is invoked. In some embodiments, the action process initiated for the first action process object, at step 810, may be initiated concurrently with the action process initiated for the second action process object, at step 816.

Processing for flowchart 800 may end at step 818, where each of the processing flows (e.g., processing flow 820 and processing flow 830) ends after completing its execution.

Figure 9:
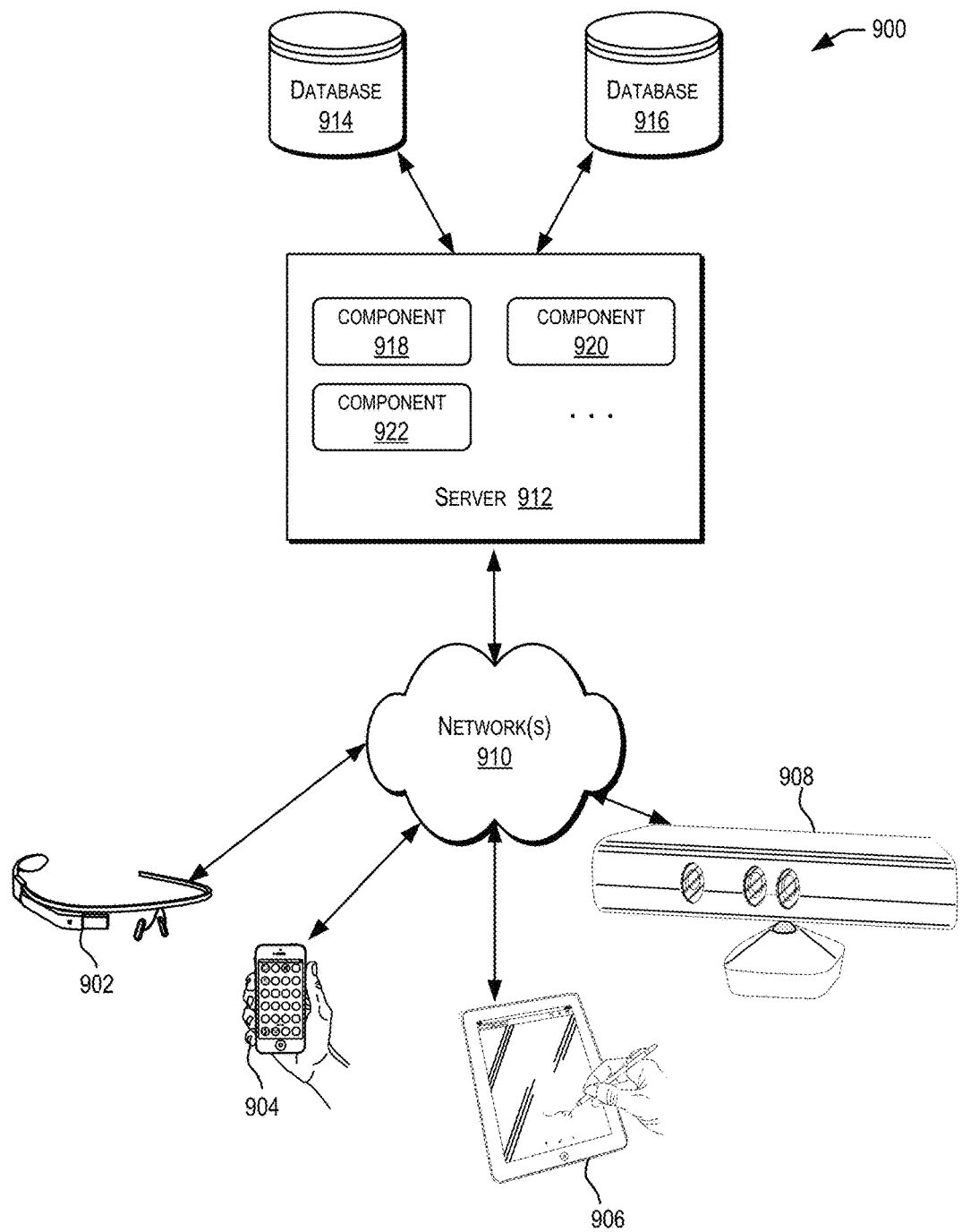
FIG. 9 depicts a simplified diagram of a distributed system for implementing an embodiment.

FIG. 9 depicts a simplified diagram of a distributed system 900 for implementing an embodiment. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications such as services and applications that may implement a device access management system for managing events related to accessing an enterprise system using remote devices. In certain embodiments, server 912 may also provide other services or software applications can include non-virtual and virtual environments. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in FIG. 9, software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

Client computing devices 902, 904, 906, and/or 908 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 910.

Although distributed system 900 in FIG. 9 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various embodiments, server 912 may be adapted to run one or more services or software applications described in the foregoing disclosure. For example, server 912 may correspond to a server for performing processing as described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. These databases may provide a mechanism for storing information such as user interactions information, usage patterns information, adaptation rules information, and other information used by embodiments of the present invention. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle that are adapted to store, update, and retrieve data in response to SQL-formatted commands.

Figure 10:
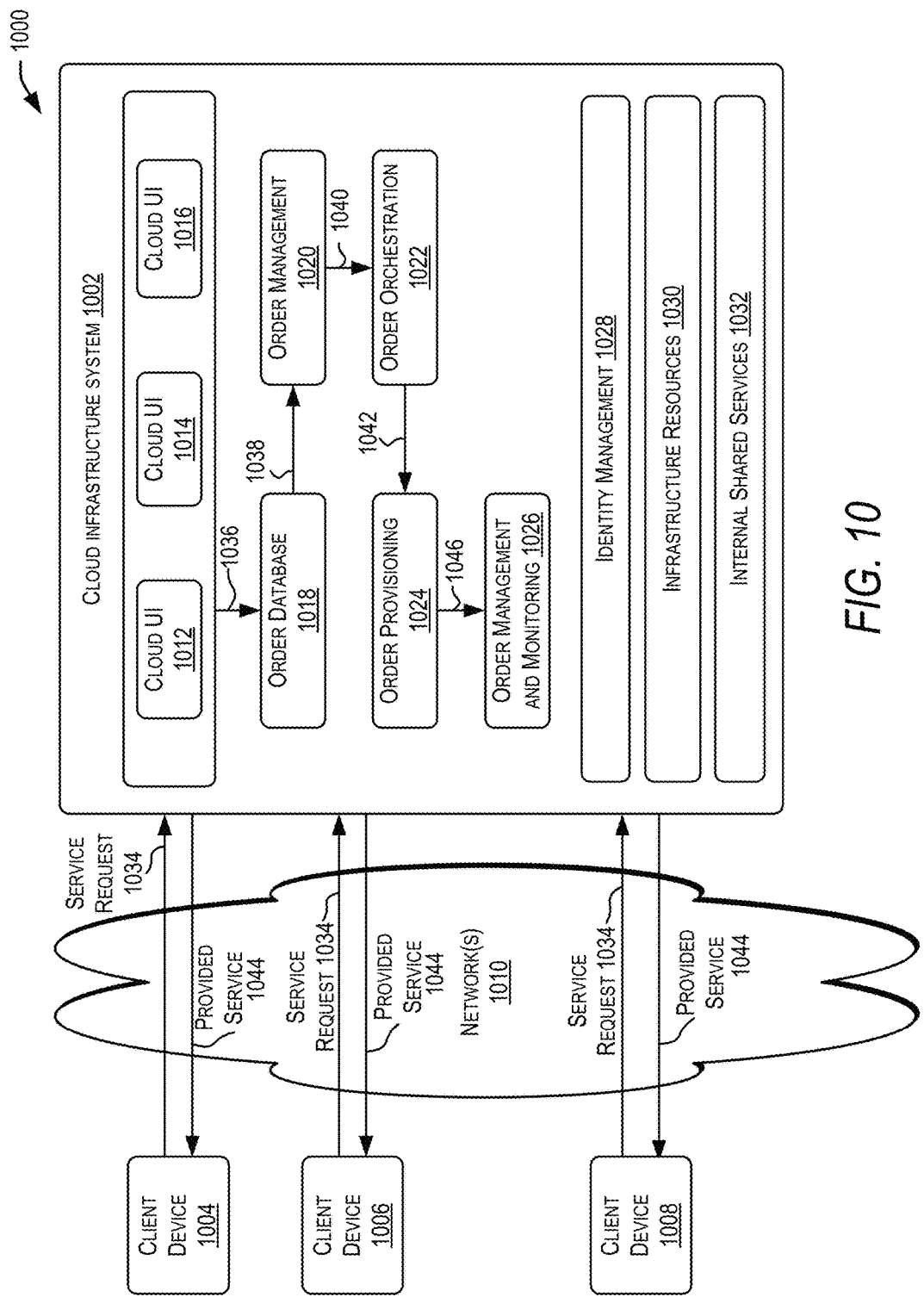
FIG. 10 is a simplified block diagram of one or more components of a system environment in which services may be offered as cloud services, in accordance with an embodiment of the present disclosure.

In some embodiments, a cloud environment may provide one or more services for managing events related to accessing an enterprise system using remote devices. FIG. 10 is a simplified block diagram of one or more components of a system environment 1000 in which services may be offered as cloud services, in accordance with an embodiment of the present disclosure. In the illustrated embodiment in FIG. 10, system environment 1000 includes one or more client computing devices 1004, 1006, and 1008 that may be used by users to interact with a cloud infrastructure system 1002 that provides cloud services, including services for managing events related to accessing an enterprise system using remote devices. Cloud infrastructure system 1002 may comprise one or more computers and/or servers that may include those described above for server 912.

It should be appreciated that cloud infrastructure system 1002 depicted in FIG. 10 may have other components than those depicted. Further, the embodiment shown in FIG. 10 is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for client computing devices 902, 904, 906, and 908. Client computing devices 1004, 1006, and 1008 may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002. Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between client computing devices 1004, 1006, and 1008 and cloud infrastructure system 1002. Each network may be any type of network familiar to those skilled in the art that can support data communications using any of a variety of commercially-available protocols, including those described above for network(s) 910.

In certain embodiments, services provided by cloud infrastructure system 1002 may include a host of services that are made available to users of the cloud infrastructure system on demand. In addition to services related to managing events related to accessing an enterprise system using remote devices, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1002 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle Corporation) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1002 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform, and other resources.

In some embodiments, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 to enable provision of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in FIG. 10, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In an exemplary operation, at step 1034, a customer using a client device, such as client computing devices 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI) such as cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

At step 1036, the order information received from the customer may be stored in an order database 1018. If this is a new order, a new record may be created for the order. In one embodiment, order database 1018 can be one of several databases operated by cloud infrastructure system 1018 and operated in conjunction with other system elements.

At step 1038, the order information may be forwarded to an order management module 1020 that may be configured to perform billing and accounting functions related to the order, such as verifying the order, and upon verification, booking the order.

At step 1040, information regarding the order may be communicated to an order orchestration module 1022 that is configured to orchestrate the provisioning of services and resources for the order placed by the customer. In some instances, order orchestration module 1022 may use the services of order provisioning module 1024 for the provisioning. In certain embodiments, order orchestration module 1022 enables the management of business processes associated with each order and applies business logic to determine whether an order should proceed to provisioning.

As shown in the embodiment depicted in FIG. 10, at step 1042, upon receiving an order for a new subscription, order orchestration module 1022 sends a request to order provisioning module 1024 to allocate resources and configure resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. This enables order orchestration module 1022 to be isolated from implementation details, such as whether or not services and resources are actually provisioned on the fly or pre-provisioned and only allocated/assigned upon request.

At step 1044, once the services and resources are provisioned, a notification may be sent to the subscribing customers indicating that the requested service is now ready for use. In some instance, information (e.g. a link) may be sent to the customer that enables the customer to start using the requested services.

At step 1046, a customer's subscription order may be managed and tracked by an order management and monitoring module 1026. In some instances, order management and monitoring module 1026 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1000 may include an identity management module 1028 that is configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
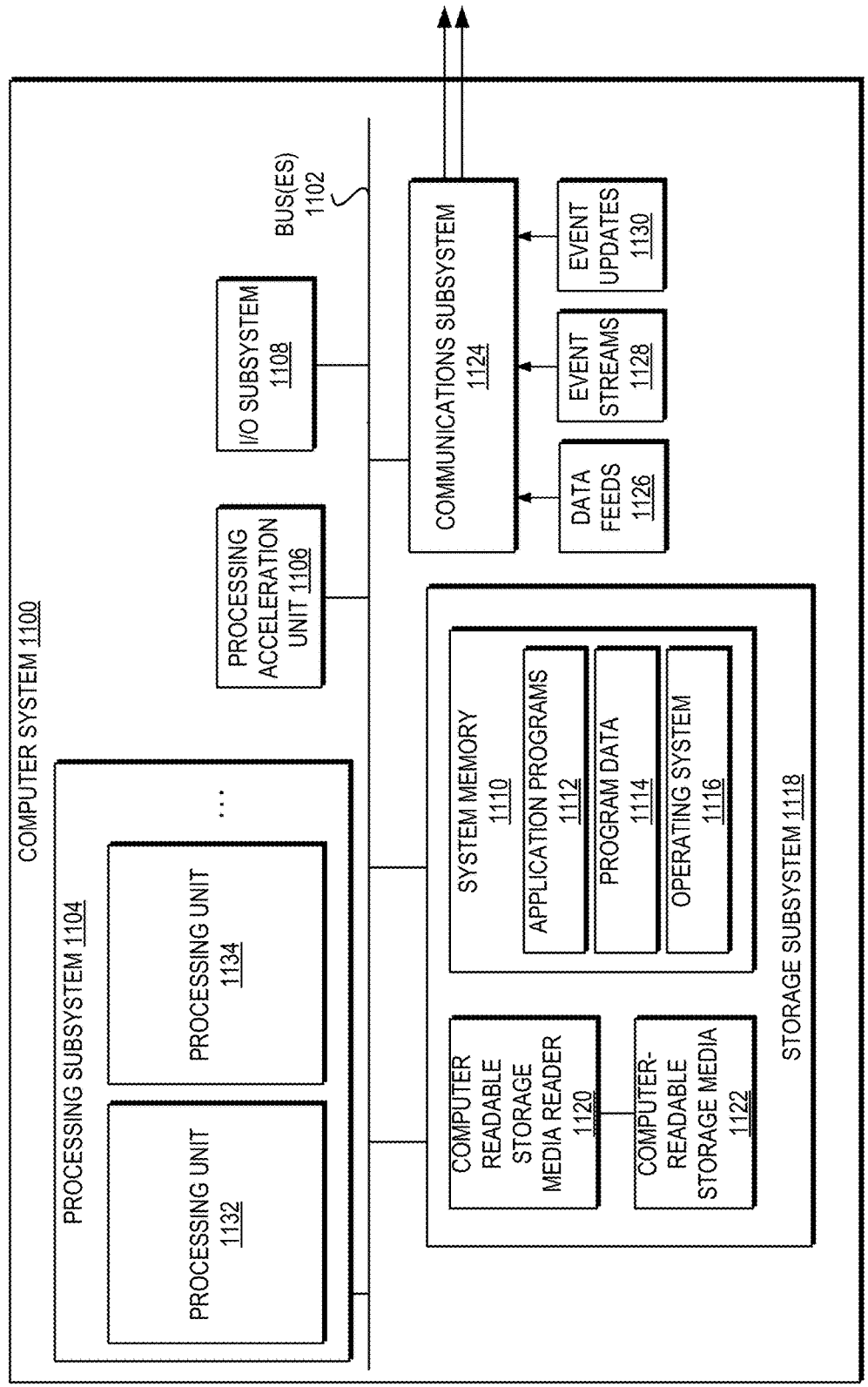
FIG. 11 illustrates an exemplary computer system that may be used to implement an embodiment of the present invention.

FIG. 11 illustrates an exemplary computer system 1100 that may be used to implement an embodiment of the present invention. In some embodiments, computer system 1100 may be used to implement any of the various servers and computer systems described above. As shown in FIG. 11, computer system 1100 includes various subsystems including a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processing units 1132, 1134, etc. A processing unit may include be one or more processors, including single core or multicore processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above for managing events related to accessing an enterprise system using remote devices.

In certain embodiments, a processing acceleration unit 1106 may be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with the present invention.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that when executed by processing subsystem 1104 a processor provide the functionality described above may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client computing devices via the Internet for receiving and sending information from and to the client computing devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

FIG. 12 illustrates an exemplary computer system 1200 that may be used to implement an embodiment of the present invention. Computing system 1200 is shown as a functional block diagram. Computer system 1200 may be configured in accordance with the principles of the present invention as described above. The functional blocks of the computer system 1200 may be implemented by hardware, software, or a combination of hardware and software to carry out the principles of the present invention. It is to be understood by those skilled in the art that the functional blocks described in FIG. 12 may be combined or separated into sub-blocks to implement the principles of the present invention as described above. Therefore, the description herein may support any possible combination or separation or further definition of the functional blocks described herein. As shown in FIG. 12, computer system 1200 includes a determining unit 1202, an identifying unit 1204, a selecting unit 1206, an establishing unit 1208, an establishing unit 1210, and a computing unit 1212.

Determining unit 1202 may determine a type of change event corresponding to a change in access to an enterprise system for a plurality of remote devices. Identifying unit 1204 may identify an action process class associated with the type of change event, wherein the action process class defines an action process to perform for the type of change event. Selecting unit 1206 may select, based on a processing load of each of a plurality of computing nodes, a set of computing nodes of the plurality of computing nodes to perform the action process for the change in access. Establishing unit 1208 may establish, based on the type of change event, a first change event object for a first set of remote devices in the plurality of remote devices, wherein a change event object indicates information about the change in access. Establishing unit 1210 may establish, based on the type of change event, a second change event object for a second set of remote devices in the plurality of remote devices, wherein each of the first set of remote devices is different from each of the second set of remote devices.

In certain embodiments, the action process for a first action process object is initiated by a first computing node of the set of computing nodes using the first change event object and the first action process object is established based on the action process class.

In certain embodiments, the action process for a second action process object is initiated by a second computing node of the set of computing nodes using the second change event object and the second action process object is established based on the action process class.

In certain embodiments, computing unit 1212 may compute the processing load for each of the plurality of computing nodes, wherein a processing load of a computing node is computed based on a number of action processes the computing node has initiated, and wherein the first computing node is selected for the set of computing nodes based on an action process threshold, and wherein each of the set of computing nodes is selected based on the processing load for each of the set of computing nodes satisfying the action process threshold.

In certain embodiments, the action process invoked using the first action process object includes transmitting, to each of the first set of remote devices, an instruction indicating the change in access, and wherein the instruction causes at least one remote device in the first set of remote devices to apply the change in access.

According to at least one example, an apparatus may be provided for managing change events for changes in access to an enterprise system. The apparatus may comprise: means for determining an action to be performed on a plurality of remote devices; means for adding, on a queue, a change event entry for each of a first set of remote devices and a second set of remote devices of the plurality of remote devices, thereby adding multiple change event entries to the queue, wherein each of the first set of remote devices is different from each of the second set of remote devices; means for assigning, from the queue to a first computing node, a first change event entry corresponding to the first set of remote devices; means for instantiating a first metadata object for the first change event entry and storing metadata identifying each of the first set of remote devices in the first metadata object; means for instructing, from the first computing node, the action to be taken on each of the first set of remote devices based on the first metadata object; means for assigning, from the queue to a second computing node, a second change event entry corresponding to the second set of remote devices; means for instantiating a second metadata object for the second change event entry and storing metadata identifying each of the second set of remote devices in the second metadata object; and means for instructing, from the second computing node, the action to be taken on each of the second set of remote devices based on the second metadata object. In certain embodiments, instantiating the first metadata object is performed on the first computing node.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   determining a type of a change event to be performed on a plurality of remote client devices, the type of the change event corresponding to an access change for the plurality of remote client devices to a computer server system;
   generating a first change event entry data structure corresponding to a first change event entry, the first change event entry data structure storing (a) information identifying each of a first subset of remote devices in the plurality of remote client devices, and (b) data identifying the determined type of the change event;
   generating a second change event entry data structure corresponding to a second change event entry, the second change event entry data structure storing (a) information identifying each of a second subset of remote devices in the plurality of remote client devices, and (b) data identifying the determined type of the change event, wherein each remote device in the first subset of remote devices is different from each remote device in the second subset of remote devices;
   adding, on a queue, the first change event entry, and the second change event entry;
   assigning, from the queue to a first computing node, the first change event entry corresponding to the first subset of remote devices;
   accessing a software metadata class from a plurality of software metadata classes, based on the determined type of the change event;
   instantiating a first metadata object based on the metadata class, storing first metadata identifying each of the first subset of remote devices in the first metadata object;
   executing, by the first computing node, the first metadata object wherein executing the first metadata object comprises instructing each of the first subset of remote devices to adjust access to the computing system based on the type of the change event indicated by the first change event entry corresponding to the first metadata object;
   assigning, from the queue to a second computing node, the second change event entry corresponding to the second subset of remote devices;
   instantiating a second metadata object based on the metadata class storing second metadata identifying each of the second subset of remote devices in the second metadata object; and
   executing, by the second computing node, the second metadata object wherein executing the second metadata object comprises instructing each of the second subset of remote devices to adjust access to the computing system based on the type of the change event indicated by the second change event entry corresponding to the second metadata object.

2. The method of claim 1, wherein instantiating the first metadata object is performed on the first computing node, and wherein instantiating the second metadata object is performed on the second computing node.

3. The method of claim 1, further comprising: selecting the first computing node for executing the first metadata object and selecting the second computing node for executing the second metadata object, wherein the selection is based on a processing load of each of a plurality of computing nodes including the first computing node and the second computing node.

4. The method of claim 3, further comprising: computing the processing load for each of the plurality of computing nodes, wherein a processing load of a computing node is computed based on a number of actions the computing node has initiated, and wherein the first computing node is selected from the plurality of computing nodes based on an action threshold, and wherein each of the plurality of computing nodes is selected based on the processing load for each of the computing nodes satisfying the action threshold.

5. The method of claim 1, wherein the type of change event includes a policy change, the policy change including a change in a compliance policy, a change in an enrollment policy, a change in a workspace policy, a change in a device policy, or a combination thereof.

6. The method of claim 1, wherein the type of change event includes an application change, the application change including adding an application to a catalog of applications accessible to the plurality of remote devices, removing an application from the catalog of applications, modifying a version of an application in the catalog of applications, or a combination thereof.

7. The method of claim 1, wherein the type of change event includes a change in a synchronization setting related to accessing the computing system.

8. The method of claim 1, further comprising:
   determining, based on the type of change event, an action process to perform.

9. The method of claim 1, further comprising executing, by the first computing node, an action to be taken on each of the first subset of remote devices concurrently with executing, by the second computing node, an action to be taken on each of the second subset of remote devices.

10. The method of claim 1, wherein instructing each remote device in the first subset of remote devices to adjust access to the computing system comprises sending a first instruction indicating an action to adjust access to the computing system corresponding to the determined type of the change event, to each of the first subset of remote devices, and wherein instructing each remote device in the second subset of remote devices to adjust access to the computing system comprises sending a second instruction indicating an action to adjust access to the computing system corresponding to the determined type of the change event, to each of the second subset of remote devices.

11. The method of claim 1, further comprising:
removing, from the queue, the first change event entry for the first subset of remote devices upon receiving a response from each of the first subset of remote devices, the response indicating that each of the first subset of remote devices has adjusted access to the computing system based on the information about the change event included in the first change event entry.

12. The method of claim 11, wherein the response is a first response, and wherein the method further comprises:
removing, from the queue, the second change event entry for the second subset of remote devices upon receiving a second response from each of the second subset of remote devices, the second response indicating that each of the second subset of remote devices has adjusted access to the computing system based on the information about the change event included in the second change event entry.

13. The method of claim 1, wherein executing the first metadata object by the first computing node comprises:
transmitting instructions to each of the first subset of remote devices to adjust access to the computing system based on the type of the change event indicated by the first change event entry corresponding to the first metadata object;
determining that responses to the transmitted instructions have been received from some but not all of the first subset of remote devices within a predetermined period of time; and
in response to determining that not all of the first subset of remote devices have responded within the predetermined period of time, periodically re-transmitting the instructions to at least one of the first subset of remote devices that has not responded within the predetermined period of time.

14. The method of claim 1, wherein executing the first metadata object by the first computing node comprises:
using a push notification service to transmit instructions to each of the first subset of remote devices to adjust access to the computing system based on the type of the change event indicated by the first change event entry corresponding to the first metadata object; and
receiving, via the push notification service, a pull request from at least one of the first subset of remote devices, the pull request corresponding to a request for further information related to the instruction to adjust access to the computing system.

15. A system comprising:
one or more processors; and
a memory storing one or more instructions which, upon execution by the one or more processors, causes the one or more processors to:
determine a type of a change event to be performed on a plurality of remote client devices, the type of the change event corresponding to an access change for the plurality of remote client devices to a computer server system;
generate a first change event entry data structure corresponding to a first change event entry, the first change event entry data structure storing (a) information identifying each of a first subset of remote devices in the plurality of remote client devices, and (b) data identifying the determined type of the change event;
generate a second change event entry data structure corresponding to a second change event entry, the second change event entry data structure storing (a) information identifying each of a second subset of remote devices in the plurality of remote client devices, and (b) data identifying the determined type of the change event, wherein each remote device in the first subset of remote devices is different from each remote device in the second subset of remote devices;
add, on a queue, a first change event entry, and the second change event entry;
assign, from the queue to a first computing node, the first change event entry corresponding to the first subset of remote devices;
access a software metadata class from a plurality of software metadata classes, based on the determined type of the change event;
instantiate a first metadata object based on the metadata class, storing first metadata identifying each of the first subset of remote devices in the first metadata object;
execute, by the first computing node, the first metadata object wherein executing the first metadata object comprises instructing each of the first subset of remote devices to adjust access to the computing system based on the type of the change event indicated by the first change event entry corresponding to the first metadata object;
assign, from the queue to a second computing node, the second change event entry corresponding to the second subset of remote devices;
instantiate a second metadata object based on the metadata class storing second metadata identifying each of the second subset of remote devices in the second metadata object; and
execute, by the second computing node, the second metadata object wherein executing the second metadata object comprises instructing each of the second subset of remote devices to adjust access to the computing system based on the type of the change event indicated by the second change event entry corresponding to the second metadata object.

16. The system of claim 15, wherein instructing each remote device in the first subset of remote devices to adjust access to the computing system comprises sending a first instruction indicating an action to adjust access to the computing system corresponding to the determined type of the change event, to each of the first subset of remote devices, and wherein instructing each remote device in the second subset of remote devices to adjust access to the computing system comprises sending a second instruction indicating an action to adjust access to the computing system corresponding to the determined type of the change event, to each of the second subset of remote devices.

17. The system of claim 15, the memory storing further instructions which, upon execution by the one or more processors, causes the one or more processors to:
select the first computing node for executing the first metadata object and selecting the second computing node for executing the second metadata object, wherein the selection is based on a processing load of each of a plurality of computing nodes including the first computing node and the second computing node.

18. A non-transitory computer-readable medium comprising one or more instructions stored thereon, that upon execution by one or more processors, causes the one or more processors to:
    determine a type of a change event to be performed on a plurality of remote client devices, the type of the change event corresponding to an access change for the plurality of remote client devices to a computer server system;
    generate a first change event entry data structure corresponding to a first change event entry, the first change event entry data structure storing (a) information identifying each of a first subset of remote devices in the plurality of remote client devices, and (b) data identifying the determined type of the change event;
    generate a second change event entry data structure corresponding to a second change event entry, the second change event entry data structure storing (a) information identifying each of a second subset of remote devices in the plurality of remote client devices, and (b) data identifying the determined type of the change event, wherein each remote device in the first subset of remote devices is different from each remote device in the second subset of remote devices;
    add, on a queue, a first change event entry, and the second change event entry;
    assign, from the queue to a first computing node, the first change event entry corresponding to the first subset of remote devices;
    access a software metadata class from a plurality of software metadata classes, based on the determined type of the change event;
    instantiate a first metadata object based on the metadata class, storing first metadata identifying each of the first subset of remote devices in the first metadata object;
    execute, by the first computing node, the first metadata object wherein executing the first metadata object comprises instructing each of the first subset of remote devices to adjust access to the computing system based on the type of the change event indicated by the first change event entry corresponding to the first metadata object;
    assign, from the queue to a second computing node, the second change event entry corresponding to the second subset of remote devices;
    instantiate a second metadata object based on the metadata class storing second metadata identifying each of the second subset of remote devices in the second metadata object; and
    execute, by the second computing node, the second metadata object wherein executing the second metadata object comprises instructing each of the second subset of remote devices to adjust access to the computing system based on the type of the change event indicated by the second change event entry corresponding to the second metadata object.

19. The non-transitory computer-readable medium of claim 18, wherein the one or more instructions, that upon execution by the one or more processors, further causes the one or more processors to:
    remove, from the queue, the first change event entry for the first subset of remote devices upon receiving a response from each of the first subset of remote devices, the response indicating that each of the first subset of remote devices has adjusted access to the computing system based on the information about the change event included in the first change event entry; and
    remove, from the queue, the second change event entry for the second subset of remote devices upon receiving a second response from each of the second subset of remote devices, the second response indicating that each of the second subset of remote devices has adjusted access to the computing system based on the information about the change event included in the second change event entry.

20. The non-transitory computer-readable medium of claim 18, wherein the one or more instructions, that upon execution by the one or more processors, further causes the one or more processors to:
    select the first computing node for executing the first metadata object and selecting the second computing node for executing the second metadata object, wherein the selection is based on a processing load of each of a plurality of computing nodes including the first computing node and the second computing node.

* * * * *

UNITED STATES PATENT AND TRADEMARK OFFICE
CERTIFICATE OF CORRECTION

PATENT NO. : 10,129,109 B2  
APPLICATION NO. : 15/476906  
DATED : November 13, 2018  
INVENTOR(S) : Jayanti Venkata et al.

Page 1 of 1

It is certified that error appears in the above-identified patent and that said Letters Patent is hereby corrected as shown below:

In the Drawings

On sheet 3 of 12, in FIG. 3, under Reference Numeral 320, Line 1, delete "SCHEULE" and insert -- SCHEDULE --, therefor.

In the Specification

In Column 14, Line 13, before "application" delete "an".

In Column 26, Line 58, delete "452,454" and insert -- 452, 454 --, therefor.

In the Claims

In Column 52, Lines 27-28, in Claim 3, delete "obj ect" and insert -- object --, therefor.

Signed and Sealed this
Twenty-ninth Day of October, 2019

Andrei Iancu
*Director of the United States Patent and Trademark Office*